United States Patent
Chen et al.

(10) Patent No.: US 11,467,314 B2
(45) Date of Patent: Oct. 11, 2022

(54) OPTICAL SENSOR ADAPTIVE CALIBRATION

(71) Applicant: Halliburton Energy Services, Inc., Houston, TX (US)

(72) Inventors: Dingding Chen, Tomball, TX (US); Christopher Michael Jones, Houston, TX (US); Bin Dai, Spring, TX (US); Megan Pearl, Spring, TX (US); James M. Price, Cypress, TX (US)

(73) Assignee: Halliburton Energy Services, Inc., Houston, TX (US)

(*) Notice: Subject to any disclaimer, the term of this patent is extended or adjusted under 35 U.S.C. 154(b) by 717 days.

(21) Appl. No.: 16/464,244

(22) PCT Filed: Jul. 16, 2018

(86) PCT No.: PCT/US2018/042336
§ 371 (c)(1),
(2) Date: May 24, 2019

(87) PCT Pub. No.: WO2020/018069
PCT Pub. Date: Jan. 23, 2020

(65) Prior Publication Data
US 2020/0284942 A1 Sep. 10, 2020

(51) Int. Cl.
*G01V 8/10* (2006.01)
*E21B 49/08* (2006.01)
(Continued)

(52) U.S. Cl.
CPC .............. *G01V 8/10* (2013.01); *E21B 49/088* (2013.01); *G01N 21/25* (2013.01); *G01V 13/00* (2013.01);
(Continued)

(58) Field of Classification Search
CPC ........ G01V 8/10; G01V 13/00; G01V 99/005; G01V 8/00; E21B 49/088; E21B 2200/20; G01N 21/25
See application file for complete search history.

(56) References Cited

U.S. PATENT DOCUMENTS 9,702,248 B2  7/2017 Chen et al.
9,726,012 B2  8/2017 Chen et al.
(Continued)

FOREIGN PATENT DOCUMENTS

WO  2013089764 A1  6/2013
WO  2017164854 A1  9/2017

OTHER PUBLICATIONS

PCT Application Serial No. PCT/US2018/042336, International Search Report and Written Opinion, dated Apr. 8, 2019, 9 pages.

*Primary Examiner* — Marcus H Taningco
(74) *Attorney, Agent, or Firm* — Delizio, Peacock, Lewin & Guerra

(57) ABSTRACT

The subject disclosure provides for a method of optical sensor calibration implemented with neural networks through machine learning to make real-time optical fluid answer product prediction adapt to optical signal variation of synthetic and actual sensor inputs integrated from multiple sources. Downhole real-time fluid analysis can be performed by monitoring the quality of the prediction with each type of input and determining which type of input generalizes better. The processor can bypass the less robust routine and deploy the more robust routine for remainder of the data prediction. Operational sensor data can be incorporated from a particular optical tool over multiple field jobs into an updated calibration when target fluid sample compositions and properties become available. Reconstructed fluid models adapted to prior field job data, in the same geological or geographical
(Continued)

area, can maximize the likelihood of quality prediction on future jobs and optimize regional formation sampling and testing applications.

20 Claims, 15 Drawing Sheets

(51) Int. Cl.
*G01N 21/25* (2006.01)
*G01V 13/00* (2006.01)
*G01V 99/00* (2009.01)

(52) U.S. Cl.
CPC ........ *G01V 99/005* (2013.01); *E21B 2200/20* (2020.05)

(56) References Cited

U.S. PATENT DOCUMENTS

| | | | | |
|---|---|---|---|---|
| 10,578,764 B2* | 3/2020 | Wilson | ................ | G01V 99/005 |
| 2007/0119244 A1 | 5/2007 | Goodwin et al. | | |
| 2015/0369656 A1* | 12/2015 | Chen | .................... | G01J 1/0295 |
| | | | | 702/104 |
| 2016/0032719 A1 | 2/2016 | Chen et al. | | |
| 2016/0273354 A1* | 9/2016 | Chen | .................... | G06N 3/0481 |
| 2016/0320527 A1* | 11/2016 | Chen | .................... | G01N 21/00 |
| 2016/0327684 A1 | 11/2016 | Chen et al. | | |
| 2017/0269260 A1 | 9/2017 | Chen et al. | | |
| 2018/0180767 A1 | 6/2018 | Chen et al. | | |
| 2019/0361146 A1* | 11/2019 | Roth | ....................... | G01V 1/50 |

* cited by examiner

OPTICAL SENSOR ADAPTIVE CALIBRATION

TECHNICAL FIELD

The present description relates in general to downhole measurement systems, and more particularly to, for example, without limitation, optical sensor adaptive calibration.

BACKGROUND

In the field of oil and gas exploration and production, characterization of formation or wellbore fluid compositions and properties is important for reservoir fluid evaluation and flow assurance analysis. For example, reservoir fluid evaluation deploys formation sampling and testing techniques to collect fluid samples with minimized contamination, and further facilitate early decision making on the economic value of potential reservoir exploration, well completion and production based on the quality prediction of the fluid compositions and properties. Flow assurance analysis may require determination of the quality of flow movement, or the condition of a pipeline through deposit (such as asphaltenes) or erosion evaluation, or to adjust and modify a drilling or production parameter, and optimize damage preventive design.

Common practice may use fluid answer product predictive models for real-time downhole fluid analysis during formation fluid sampling and testing. Real-time formation fluid analysis using fluid characterization models with synthetic optical sensor inputs is sensitive to the quality of sensor data transformation from the downhole tool parameter space to the synthetic parameter space, and to the quality of multivariate input selection. In common practice, each sensor has its own sensor-based fluid characterization models and cross-space data transformation models. While fluid characterization models are calibrated in a synthetic database using virtual sensor responses on a large collection of global oil and fluid samples with known properties, cross-space data transformation models are usually trained on a small number of reference fluids with measured sensor responses as calibration inputs and simulated virtual sensor responses as calibration outputs.

Traditional optical sensor calibration methods for fluid answer product prediction are based on synthetic sensor data, and the quality of real-time field data prediction depends on the uncertainty of the calibration data, the robustness of resulting models, and the reliability of reconstructed synthetic sensor data from field operational sensor responses. The models built on pure synthetic sensor data alone may suffer unpleasant variation in prediction if calibration data is unrealistic or field sample compositions and properties are out of calibration data range. The issue may also arise if optical sensor data transformation/standardization algorithms built on the certain reference fluids fail to generalize the well on the new data and/or to tolerate unexpected raw sensor signal change over time, making re-constructed synthetic sensor data questionable.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1:
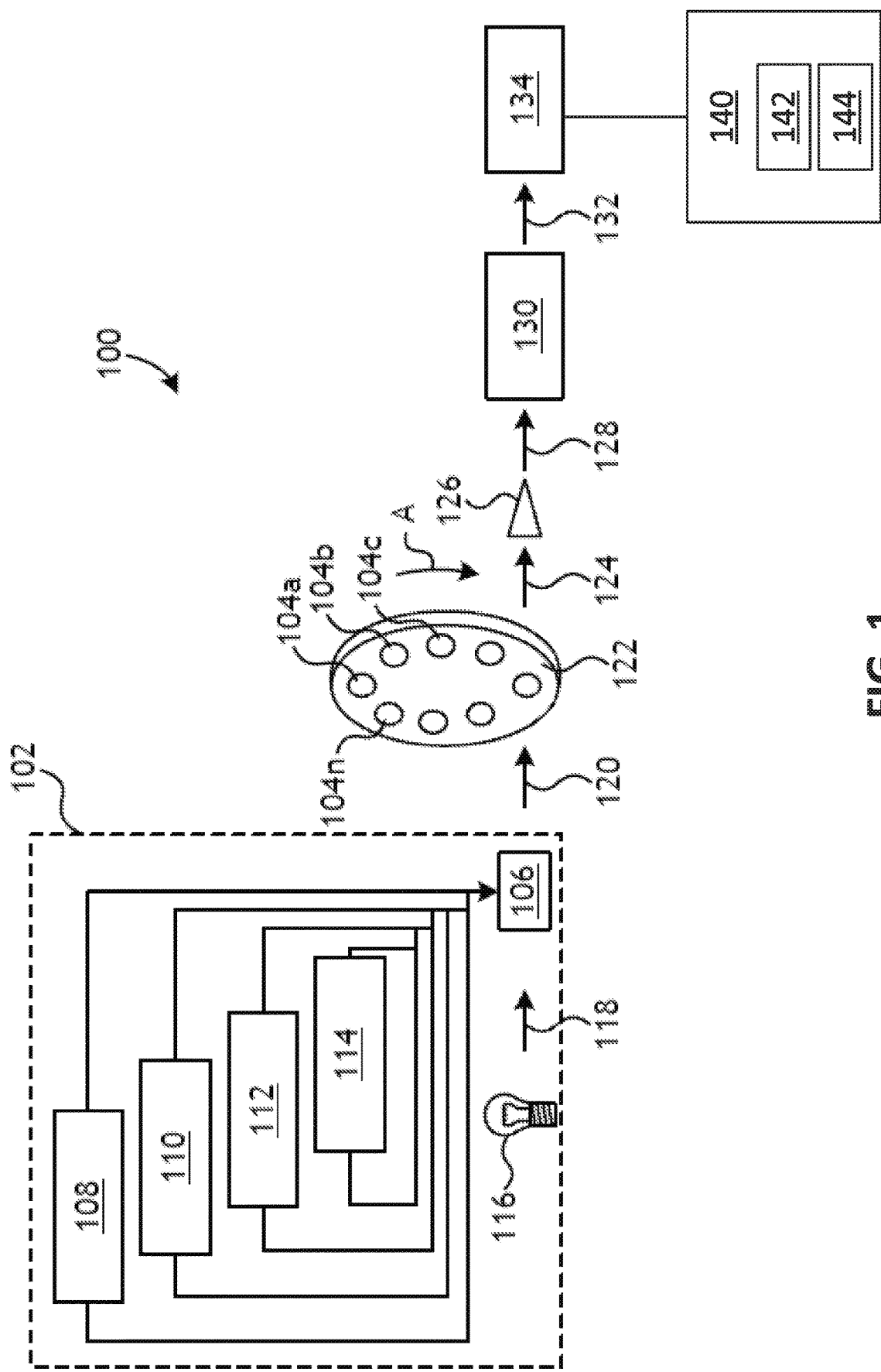
FIG. 1 illustrates a calibration system used to calibrate an optical sensor in accordance with one or more implementations of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

After manufacture and before downhole use, each optical computing device is carefully calibrated against known reference fluids for temperature and pressure ranges expected to be encountered in the field. The measurement data of each sensing element on the given reference fluids form the basis for developing optical signal transformation models. Once selected reference fluids adequately possess representative features of global petroleum and/or formation fluids, the optical signal transformation algorithms calibrated with a variety of structures can be found for a wide range of applications in processing downhole optical tool data.

Formation fluid analysis uses field sensor measurements obtained from downhole fluid sampling. Accordingly, factors that may have strong impact on the quality of fluid prediction (e.g., fluid composition and fluid characteristics) include variations in downhole fluid pumping rate, a transient status in the flow line, tool vibrations, firmware changes, the condition of sensing elements and optical system components, fluid contamination level, and other testing conditions. Optical sensor adaptive calibration as disclosed herein provides a robust real-time fluid prediction with respect to the above factors. This may be particularly desirable when a new sensor is deployed for the first time.

The subject disclosure provides for an improved method for optical sensor calibration to overcome the limitation above through adapting potential optical signal vibration of both synthetic and actual sensor inputs integrated from multiple sources. For example, the subject disclosure provides for a novel adaptive calibration method to make real-time optical fluid answer product prediction less dependent to the sparse data based sensor signal transformation. The fluid predictive models calibrated with the adaptive calibration of the subject technology are compatible with each type of inputs, making in-situ signal processing workflow switching possible by using either alternative type of sensor inputs or ruggedized real-time downhole fluid analysis.

The adaptive calibration method of the subject technology is implemented with neural networks through enhanced machine learning, which has the power to accurately fit the training data from various measurement and simulation sources, and meanwhile generalize well on the unseen new data. For sensor-based fluid model calibration, conventional synthetic sensor data is combined with measured actual sensor data through a novel normalization scheme and create a new pooled calibration environment. The subject disclosure also provides for the incorporation of operational sensor data from a particular optical tool over multiple field jobs into an updated calibration when target fluid sample compositions and properties become available. The re-constructed fluid models adapted to previous field job data, especially in the same geological or geographical area, would maximize the likelihood of quality prediction on the future jobs and optimize regional formation sampling and testing applications.

Since fluid answer product predictive models calibrated with the adaptive calibration of the subject technology are compatible with both synthetic and actual sensor inputs, downhole real-time fluid analysis can then be performed by monitoring the quality of the prediction with each type of inputs and determining which type of inputs generalizes better. The processor can then bypass the less robust routine and keep the better one for rest of data prediction. This approach overcomes the current limitation, which only relies on transformed optical sensor data for real-time fluid analysis, and therefore improves the service quality of formation sampling and testing.

Using available lab and quality control results on previous jobs to modify the model calibration applied to new jobs would help regional historical fluid data interpretation. The job relevant sensor data can be used alone or integrated with generic calibration data for pooled data calibration. The target inclusive information will help maximize the chance of quality data prediction for the sensor deployed in future jobs. This approach is particularly suitable to the sensors or tools deployed in the same geological/geographical area, and capable of compensating for optical signal variations over time in both synthetic and actual sensor spaces.

The subject technology provides several advantages over traditional calibration methods, such as 1) maximizing the likelihood of quality prediction by making calibration less dependent to a single type of inputs, 2) overcoming the limitation associated with reference fluid selection and reverse transformation, 3) implementing adaptive calibration in pooled sensor spaces with neural network based deep learning, and 4) providing an alternative workflow for quality assurance control of fluid model prediction during real-time data processing.

Optical sensor adaptive calibration as disclosed herein may include pools of optical sensors having the same or similar multi-element configuration, and sharing at least one integrated computation element (ICE) having the same or similar design. Without limitation, some of the ICE designs used as sensing elements in optical sensors as disclosed herein may include a methane ICE (designed to measure methane concentration), a gas-oil-ratio (GOR) ICE (designed to measure GOR in a fluid), or an aromatics (ARO) ICE (designed to measure ARO concentration), among others.

An ICE as disclosed herein is a processing element that optically interacts with a substance to determine quantitative and/or qualitative values of one or more physical or chemical properties of a substance to be analyzed. An ICE may include a plurality of optical layers consisting of various materials whose index of refraction and size (e.g., thickness) may vary between each layer. The ICE may comprise a multilayered interference element designed to operate over a continuum of wavelengths in the electromagnetic spectrum from the ultraviolet (UV, about 290 nm to about 400 nm), through the visible (VIS, about 400 nm to about 750 nm), through the near-infrared (NIR, about 750 nm to about 2500 nm), and to mid-infrared ranges (MIR, about 2500 nm to about 10,000 nm), or any sub-set of that region. An ICE design refers to the number and thickness of the respective layers of the ICE. The layers may be strategically deposited and sized to selectively pass predetermined fractions of electromagnetic radiation at different wavelengths configured to substantially mimic a regression vector corresponding to a particular physical or chemical property of interest of a substance. Accordingly, an ICE design will exhibit a transmission function that is weighted with respect to wavelength. As a result, the output light intensity from the ICE conveyed to a detector may be related to the physical or chemical property of interest for the substance. For example, electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance. The characteristic of the substance may include a quantitative or qualitative value of one or more chemical constituents or compounds present therein, or any physical property associated therewith. Such chemical constituents and compounds may be alternately referred to as "analytes." Illustrative characteristics of a substance that can be monitored with optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "optical computing device" refers to an optical device that is configured to receive an input of electromagnetic radiation, to interact the electromagnetic radiation with a substance and to produce an output of electromagnetic radiation from a processing element arranged within the optical computing device. In some implementations, an optical computing device also includes a detector to generate an electronic signal indicative of a characteristic of the substance. The processing element may be, for example, an ICE, or a multivariate optical element (MOE). The electromagnetic radiation that optically interacts with the processing element is modified to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, phosphorescence, scintillation, incandescence, Raman, Mie, and/or Raleigh scattering, can also be monitored by optical computing devices.

An optical sensor as disclosed herein may include at least one or more sensing elements. In some implementations, at least one of the sensing elements is an ICE designed to measure a fluid characteristic or property. According to some implementations, an ICE is essentially an optical interference-based device that can be designed to operate over a continuum of wavelengths in the electromagnetic spectrum from the UV to mid-infrared (MIR) ranges, or any sub-set of that region. Electromagnetic radiation that optically interacts with a substance is changed and processed by the ICE to be readable by a detector, such that an output of the detector can be correlated to the physical or chemical property of the substance being analyzed. Other examples of sensing elements and optical system components may include band-pass filters, notch filters, neutral density filters, beam-splitters, polarizing beam-splitters, prisms, diffraction gratings, Fresnel lenses, and the like.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

As used herein, the term "electromagnetic radiation" refers to radio waves, microwave radiation, any radiation in the UV, VIS, NIR or MIR regions, X-ray radiation and gamma ray radiation.

The terms "optical computing device" and "optical sensor" may be used herein interchangeably and refer generally to a sensor configured to receive an input of electromagnetic radiation that has interacted with a substance and produced an output of electromagnetic radiation from a sensing element arranged within or otherwise forming part of the optical computing device. The sensing element may be, for example, an ICE as described above. Prior to field use, the optical computing device, with each sensing element employed therein, is calibrated such that each output response can be used in conjunction with others to calculate fluid composition and properties through various signal transformation and characterization models upon being exposed to downhole conditions. When an optical computing device is not properly calibrated, the resulting models or algorithms, which correlate optical sensor responses to the fluid characteristics of interest, may not be able to provide accurate fluid predictions upon deployment.

FIG. 1 illustrates an exemplary calibration system 100 that may be used to calibrate one or more sensing elements used in an optical sensor. As illustrated, system 100 may include a measurement system 102 in optical communication with one or more sensing elements 104 (shown as 104a, 104b, 104c . . . 104n) that are to be calibrated. Each sensing element 104a-n may include, without limitation, an optical band-pass filter or a multivariate sensing element/integrated computational element (e.g., an ICE). Measurement system 102 may circulate one or more reference fluids with different chemical compositions and properties (i.e., methane concentration, aromatics concentration, saturates concentration, GOR, and the like) through an optic cell 106 over widely varying calibration conditions of temperature, pressure, and density. Thus, optical transmission and/or reflection measurements of each reference fluid in conjunction with each sensing elements 104a-n may be made at such conditions.

Measurement system 102 may comprise an optical pressure-volume-temperature (PVT) instrument, and the reference fluids circulated in the measurement system 102 may include representative fluids commonly encountered in downhole applications. System 100 may collect output signals from each sensing element 104a-n for each specified reference fluid at varying calibration conditions. In some cases, the reference fluids may include representative fluids that are easy to operate for manufacturing calibration such as: dodecane, nitrogen, water, toluene, 1-5 pentanediol, and two liquid crude oils or fluids with no gas concentration (e.g., dead oil). The crude reservoir oils used as reference fluids may be, for example, global oil library 13 (or "GOL13"), and global oil library 33 (or "GOL33"). In other cases, the reference fluids may include samples of live oils mixed with dead oil and hydrocarbon gas, e.g., methane, and the samples of hydrocarbon gases and/or $CO_2$.

Measurement system 102 may vary each reference fluid over several set points spanning varying calibration conditions. To accomplish this, as illustrated, measurement system 102 may include a liquid charging system 108, a gas charging system 110, a temperature control system 112, and a pressure control system 114. The liquid charging system 108 injects reference fluids into the fluid circuit to introduce fluid varying perturbations such that calibrating the sensing elements 104a-n will incorporate all the expected compounds found in the particular reference fluid. The gas charging system 110 may inject known gases (e.g., $N_2$, $CO_2$, $H_2S$, methane, propane, ethane, butane, combinations thereof, and the like) into the circulating reference fluids. The temperature control system 112 may vary the temperature of the reference fluid to simulate several temperature set points that the sensing elements 104a-n may encounter downhole. Lastly, the pressure control system 114 may vary the pressure of the reference fluid to simulate several pressure set points that the sensing elements 104a-n may encounter downhole.

Optic cell 106 is fluidly coupled to each system 108, 110, 112, and 114 to allow the reference fluids to flow therethrough and recirculate back to each of the systems 108, 110, 112, and 114 in a continuous, closed-loop fluid circuit. While the reference fluid circulates through optic cell 106, a light source 116 emits electromagnetic radiation 118 that passes through optic cell 106 and the reference fluid flowing therethrough. As the electromagnetic radiation 118 passes through the optic cell 106 it optically interacts with the reference fluid and generates sample interacted light 120, which includes spectral data for the particular reference fluid circulating through the measurement system 102 at the given calibration conditions or set points. The sample interacted light 120 may be directed toward sensing elements 104a-n, which, as illustrated, may be arranged or otherwise disposed on a sensing platform 122. Sensing elements 104a-n receive sample interacted light 120 and generate a computation light 124 that is measured by a detector 126.

Sensing platform 122 is configured to provide at least a portion of sample interacted light 120 having similar optical properties to each of the plurality of sensing elements 104a-n. In some implementations, sensing platform 122 provides the same portion of sample interacted light 120 to the plurality of sensing elements 104a-n in a known time sequence. In some implementations, sensing platform 122 includes a sensor wheel configured to rotate in the direction A, about an axis parallel to the impinging sample interacted light 120. While shown as arranged in a single ring on sensing platform 122, sensing elements 104a-n may alternatively be arranged in two or more rings on the sensing platform 122. Once calibrated, according to implementations disclosed herein, sensing elements 104a-n mounted on sensing platform 122 may be included in a downhole tool for measurement of a fluid characteristic.

During calibration, sensing platform 122 may be rotated at a predetermined frequency such that each sensing element 104a-n may optically interact with the sample interacted light 120 for a brief period and sequentially produce optically interacted light 124 that is conveyed to detector 126. Detector 126 may be generally characterized as an optical transducer and may comprise, but is not limited to, a thermal detector (e.g., a thermopile), a photo-acoustic detector, a semiconductor detector, a piezo-electric detector, a charge coupled device (CCD) detector, a video or array detector, a split detector, a photon detector (e.g., a photomultiplier tube), photodiodes, and any combination thereof. Upon receiving individually-detected beams of computation light 124 from each sensing element 104a-n, detector 126 may generate or otherwise convey corresponding response signals 128 to a data acquisition system 130. A data acquisition system 130 may time multiplex each response signal 128 received from the detector 126 corresponding to each sensing element 104a-n. A corresponding set of resulting output signals 132 is generated and conveyed to a fluid analysis device 134, for processing and providing input parameters for various fluid predictive models. The fluid predictive models use outputs from each sensing element 104a-n as candidate variables.

In some implementations, the fluid analysis device 134 may be coupled to a computer 140, which may include a memory 142 and a processor 144. Memory 142 may store commands which, when executed by processor 144, cause computer 140 to perform at least some of the steps in the methods described herein and otherwise consistent with the present disclosure. For example, in implementations consistent with the present disclosure, models and algorithms for data processing and fluid computation models as disclosed herein may be implemented into processor 144.

Once sensing platform 122 is calibrated, one or more calibrated sensing platforms 122 may then be installed on a downhole tool with other system components, for assembly validation testing. To validate the optical response of the sensor assembly, the sensor may be placed in an oven that regulates the ambient temperature and pressure. The reference fluids used to calibrate sensing platform 122 may be selectively circulated through the optical sensor at similar set points used to calibrate the sensing elements 104a-n. More particularly, the reference fluids may be circulated through the optical sensor at various set point downhole conditions (i.e., elevated pressures and temperatures) to obtain measured optical responses.

Sensing elements 104a-n are calibrated using the response of the sensors to reference fluids in a tool parameter space. On the other hand, fluid spectroscopic analysis and fluid predictive model calibration using a large amount of data in a standard oil library is performed in a synthetic parameter space. Synthetic sensor responses for each sensor in the downhole tool are calculated as a dot product of full-wavelength-range of fluid spectrometry and sensor element spectrum excited by a light source. The value of the dot product may vary nonlinearly or linearly compared to the actual sensor response due to the difference between the mathematical approximation used in calculating synthetic sensor response and the real system implementation. To compensate for the difference above, the measurement data from the sensors in the downhole tool can be transformed from the tool parameter space to the synthetic parameter space through a reverse transformation algorithm before applying fluid predictive models. In some implementations, fluid predictive models are calibrated with different synthetic optical inputs, and saved as candidate models in an optical fluid model base.

Figure 10:
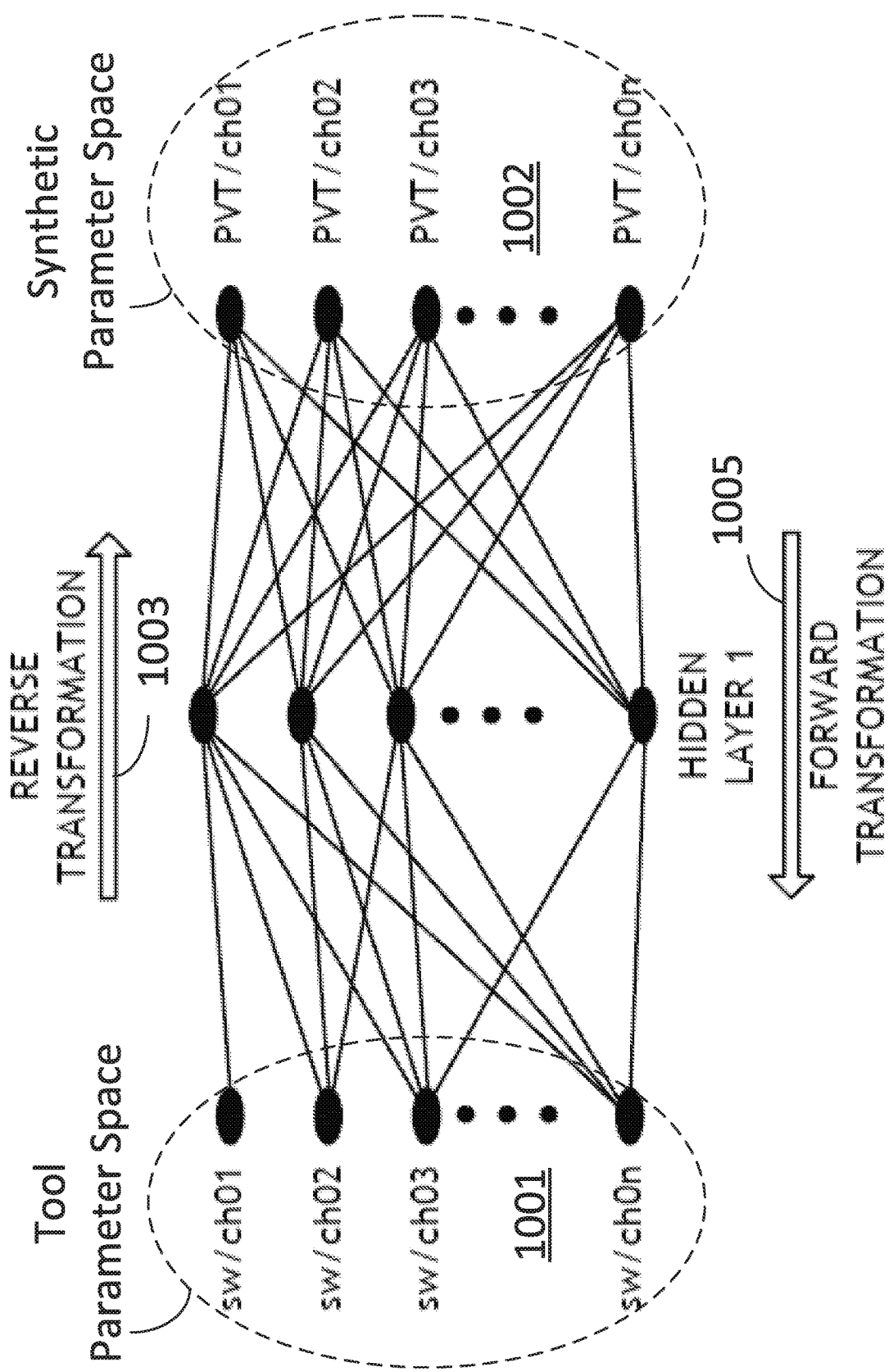
FIG. 10 illustrates a general transformation model framework applied to a forward transformation and a reverse transformation between a tool parameter space and a synthetic parameter space with neural networks in accordance with one or more implementations of the subject technology.

In current practice, an optical fluid model is dependent on the downhole tool used for measurement and includes data transformation (i.e., standardization) models and property predictive models. To provide adequate flexibility for optical data processing and interpretation, an optical fluid model includes the following candidate constituents: transformation models calibrated on selected reference fluids through reverse transformation, transformation models calibrated on selected reference fluids through forward transformation, and predictive models calibrated on both Optical-PVT database and sensing platform 122 data spaces. Depending on the data space in which the fluid property predictive models are calibrated, data transformation models convert measured or simulated optical sensor output between a tool parameter space and a synthetic parameter space. FIG. 10 illustrates one such transformation.

The synthetic sensor data that is synthesized from Optical-PVT fluid spectroscopies, the measured sensor wheel transmittance spectra, and approximated transfer function of optical train system, is traditionally used alone with corresponding fluid composition and property data (known as target characteristics) to calibrate fluid answer product predictive models for real-time downhole fluid analysis during formation fluid sampling and testing. The synthetic sensor database usually contains a large number of oil and gas samples collected globally which represent typical fluid information of heavy oil, medium oil, volatile and light oil, oil and gas condensates, wet and dry gas in different geographical regions. The optical responses simulated in synthetic sensor space is different from actual sensor responses mainly because of the variation or uncertainty of transfer function of optical train system convolved over the firmware components such as light source, fluid cell/window, calcium fluoride (CaF2), and signal detector after the tool is built.

To apply the fluid answer product predictive models calibrated in synthetic parameter space, the current practice relies on a transformation or signal standardization algorithm that converts the actual sensor responses to synthetic sensor responses through a nonlinear mapping with neural network, for example. The transformation algorithm is typically calibrated on the selected reference fluids with both measured actual sensor responses in manufacturing calibration and simulated synthetic sensor responses at the same temperature and pressure setting points available. However, only a small number of fluids can be selected as reference fluids for transformation algorithm development on each sensor. In this respect, the quality transformation, which demands use of more reference fluids to achieve unbiased mapping, therefore becomes a challenging problem for real-time downhole optical fluid analysis. In addition, the change on reference fluids selection due to its availability in stock may also alter the training data distribution in calibrating transformation algorithm that could affect the data mapping during signal processing.

Figure 2A:
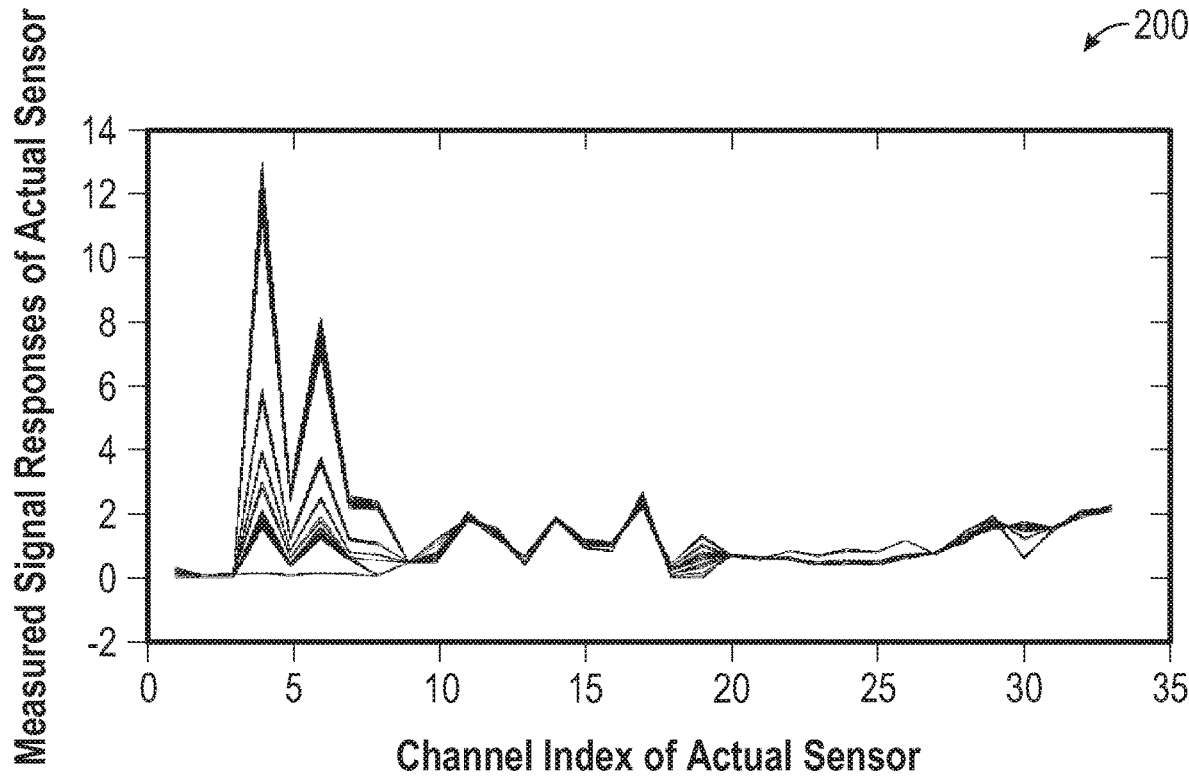
FIG. 2A illustrates a waveform depicting an example of a dynamic range of actual sensor responses of each channel on reference fluids in accordance with one or more implementations of the subject technology.
Figure 2B:
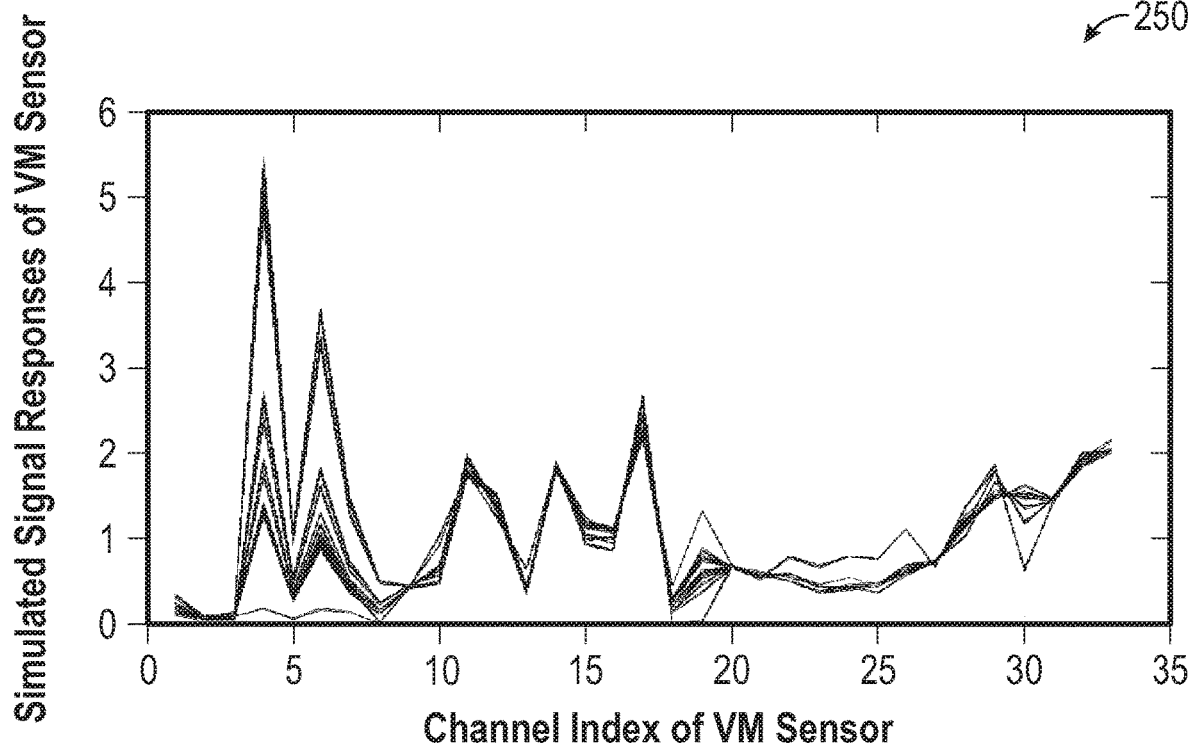
FIG. 2B illustrates a waveform depicting an example of a dynamic range of synthetic sensor responses of each channel on reference fluids in accordance with one or more implementations of the subject technology.

FIG. 2A illustrates a waveform 200 depicting an example of a dynamic range of actual sensor responses of each channel on reference fluids in accordance with one or more implementations. FIG. 2B illustrates a waveform 250 depicting an example of a dynamic range of synthetic sensor responses of each channel on reference fluids in accordance with one or more implementations.

FIGS. 2A and 2B illustrate the dynamic range of optical signal responses on a number of reference fluids obtained from an actual sensor and a synthetic sensor respectively. The sensor consists of 33 effective channels or components realized with different ICEs to measure various analyte-specific fluid compositions and properties. Although the measured actual sensor responses (e.g., 200) and simulated synthetic sensor responses (e.g., 250) in FIGS. 2A and 2B, respectively, are significantly different in initial scale on some data channels, they can be demonstrated in close similarity in normalized scale with dynamic range on each channel varied from −1 to +1 as shown in FIGS. 3A and 3B.

Figure 3A:
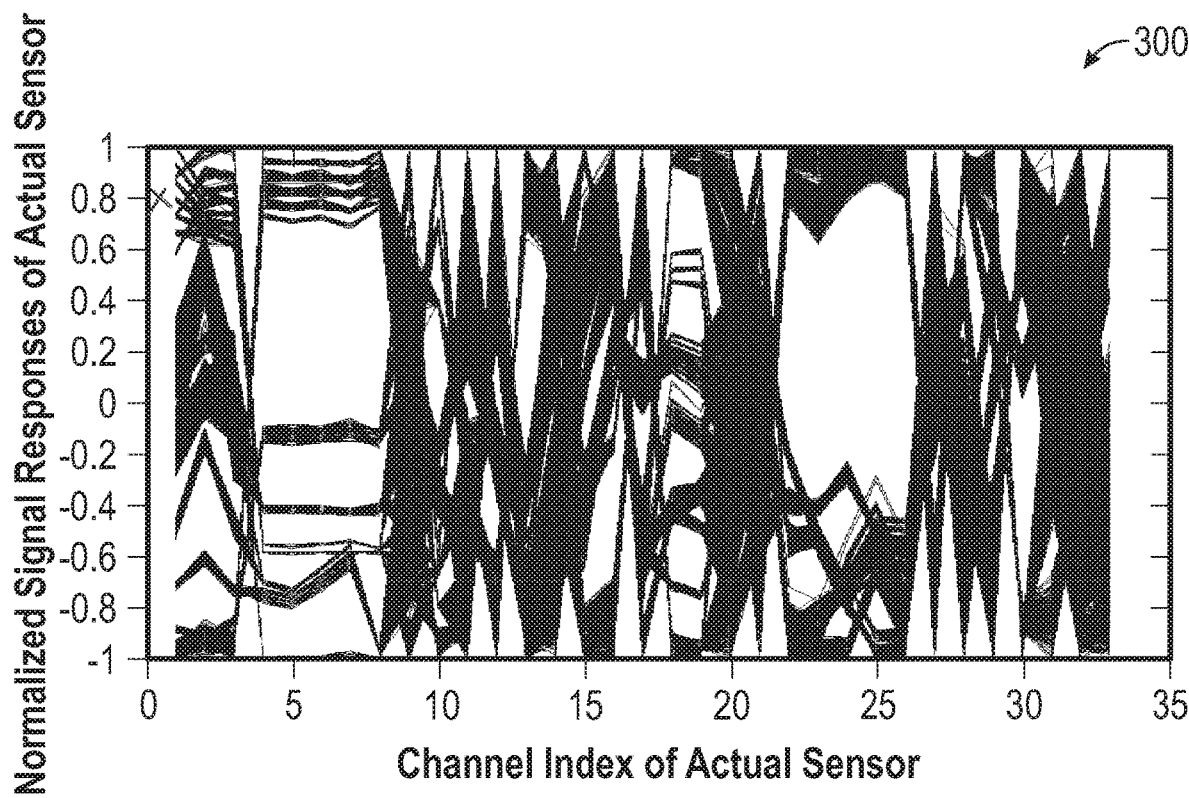
FIG. 3A illustrates a waveform depicting an example of a normalized scale of actual sensor responses of each channel on reference fluids in accordance with one or more implementations of the subject technology.
Figure 3B:
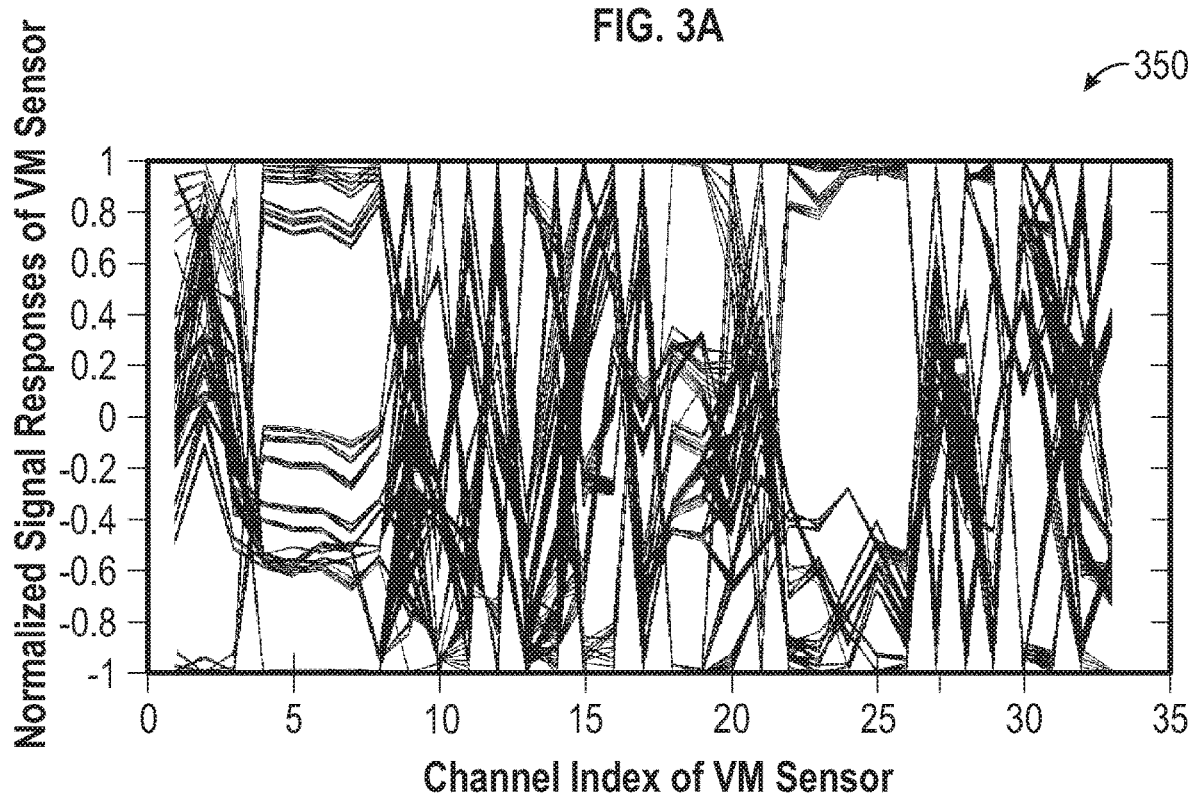
FIG. 3B illustrates a waveform depicting an example of a normalized scale of synthetic sensor responses of each channel on reference fluids in accordance with one or more implementations of the subject technology.

FIG. 3A illustrates a waveform 300 depicting an example of a normalized scale of actual sensor responses of each channel on reference fluids in accordance with one or more implementations. FIG. 3B illustrates a waveform 350 depicting an example of a normalized scale of synthetic sensor responses of each channel on reference fluids in accordance with one or more implementations.

The identified feature from normalized data evaluation motivates development of an improved calibration scheme by using merged data, which can adapt the optical signal variation in both synthetic and actual sensor spaces with more complex neural network structures. It is expected that reliability of real-time optical fluid analysis would be improved with implementation of the adaptive calibration even if the synthetic sensor data transformed from raw optical data fails to work properly as validated model inputs due to large mapping error. This is benefited from adaptively calibrated fluid models that can alternatively take actual sensor responses as inputs directly to generate substituted outputs in answer product prediction for early decision making during formation fluid sampling and testing.

The subject disclosure provides for an improved method for optical sensor calibration to overcome the limitation above through adapting potential optical signal vibration of both synthetic and actual sensor inputs integrated from multiple sources. For example, the subject disclosure provides for a novel adaptive calibration method to make real-time optical fluid answer product prediction less dependent to the sparse data based sensor signal transformation. The fluid predictive models calibrated with the adaptive calibration of the subject technology are compatible with each type of inputs, making in-situ signal processing workflow switching possible by using either alternative type of sensor inputs or ruggedized real-time downhole fluid analysis.

Figure 4:
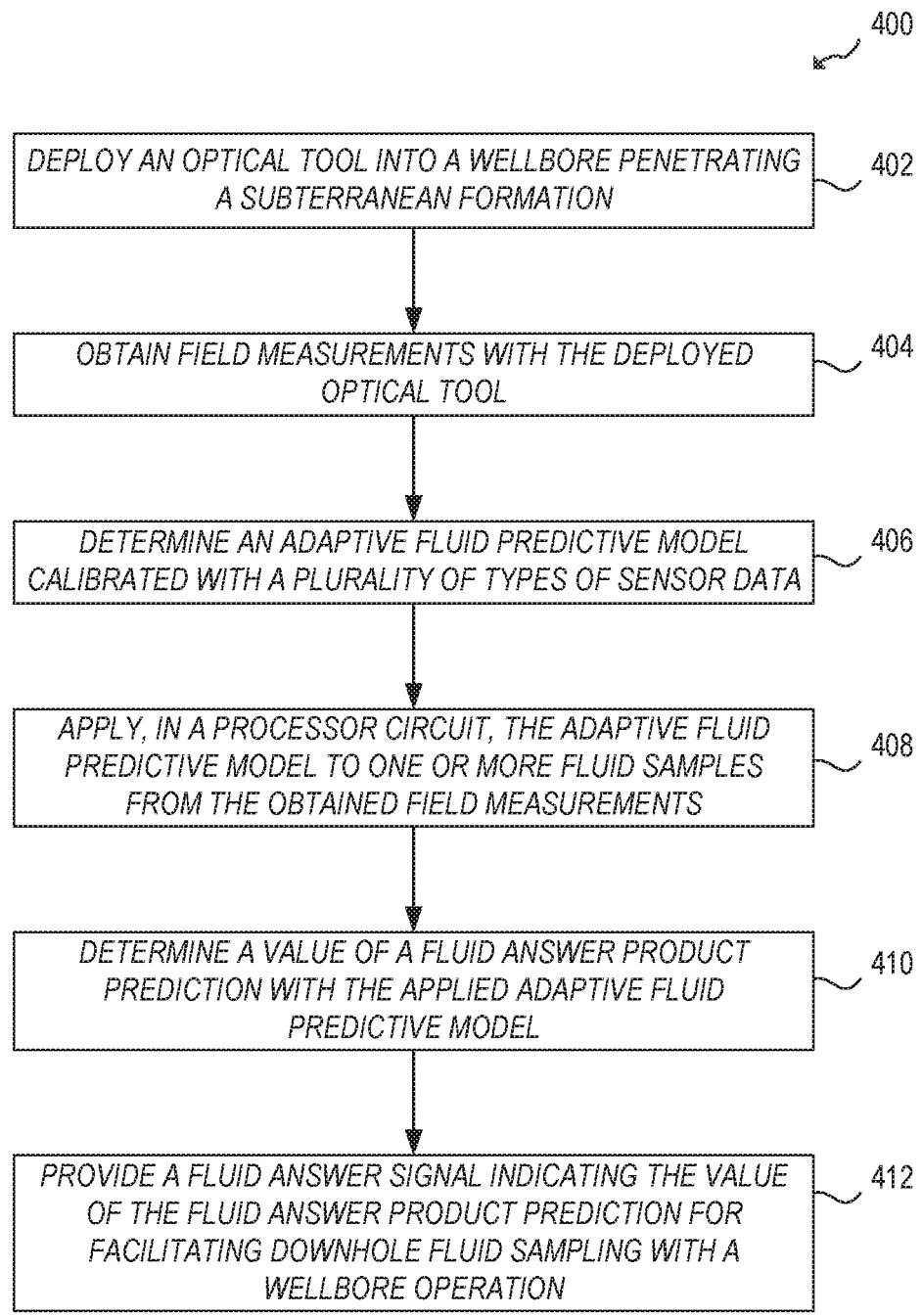
FIG. 4 illustrates a flowchart of a process for optical sensor adaptive calibration in accordance with one or more implementations of the subject technology.

FIG. 4 illustrates a flowchart of a process 400 for optical sensor adaptive calibration in accordance with one or more implementations of the subject technology. Further for explanatory purposes, the blocks of the sequential process 400 are described herein as occurring in serial, or linearly. However, multiple blocks of the process 400 may occur in parallel. In addition, the blocks of the process 400 need not be performed in the order shown and/or one or more of the blocks of the process 400 need not be performed.

The process 400 starts at step 402, where an optical tool is deployed into a wellbore penetrating a subterranean formation. Next, at step 404, field measurements are obtained with the deployed optical tool. Subsequently, at step 406, an adaptive fluid predictive model calibrated with a plurality of types of sensor data is determined. In some aspects, the plurality of types of sensor responses include a first type of sensor response associated with a synthetic parameter space and a second type of sensor response associated with a tool parameter space. Next, at step 408, the adaptive fluid predictive model is applied, in a processor circuit, to one or more fluid samples from the obtained field measurements. Subsequently, at step 410, a value of a fluid answer product prediction is determined with the applied adaptive fluid predictive model. Next, at step 412, a fluid answer signal indicating the value of the fluid answer product prediction is provided for facilitating downhole fluid sampling with a wellbore operation.

In some implementations, a fluid answer product or "fluid answer signal" may be generated and otherwise derived from the various adaptive fluid predictive model responses discussed herein. The fluid answer signal, for example, may be computed and generated using the computing subsystem 1110 (see FIG. 11) of the surface equipment 1112 (see FIG. 11), or with any other computing device or facility with access to the adaptive fluid predictive model responses. The fluid answer signal values may be provided on a graphical user interface or any other format capable of displaying or providing fluid answer product prediction values for consideration. In some implementations, the fluid answer signal may include and graphically display evaluation results taken from some or all of the logging tool 1102 (see FIG. 11). In at least one implementation, the fluid answer signal may further include a composite log derived from field measurements obtained from the logging tool 1102. The fluid answer signal may also include interpretation highlights that identify intervals of interest, historical results, and possible recommendations on proceeding, such as preferred locations to perform downhole fluid sampling. In some implementations, the fluid answer signal may further include an interpretation and evaluation legend providing rig (e.g., wireline) operation recommendations and solutions.

In some implementations, the wellbore operation includes adjusting and/or modifying a wireline operation. For example, the value of the fluid answer product prediction may facilitate in guiding the wireline operation as it moves downward through the region of interest. In other implementations, the wellbore operation includes adjusting and/or modifying a production parameter. The wellbore operation is facilitated by the value of the fluid answer product prediction to improve the service quality of regional formation sampling and testing. In some aspects, the value of the fluid answer product prediction facilitates the wellbore operation to maximize the chance of quality data prediction for the sensor deployed in future jobs.

Figure 5:
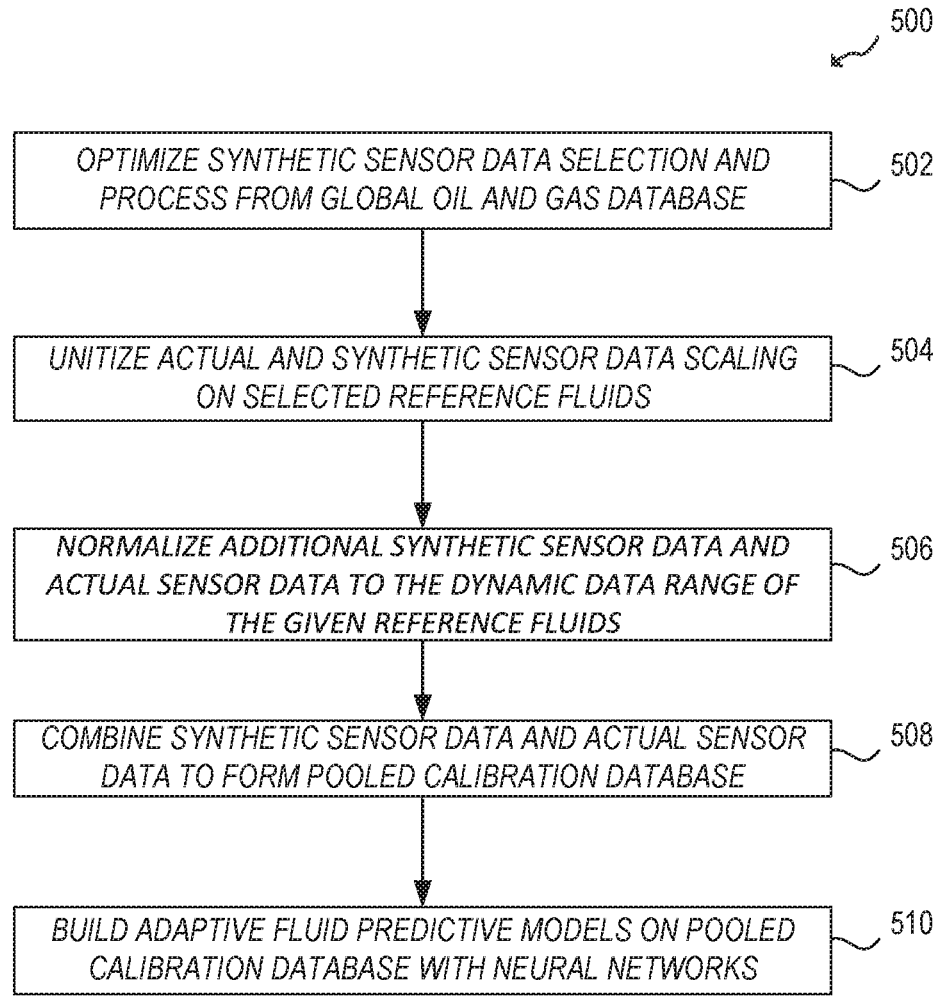
FIG. 5 illustrates a flowchart diagram of an example of a process for performing optical sensor adaptive calibration in accordance with one or more implementations of the subject technology.

FIG. 5 illustrates a flowchart diagram of an example of a sequential process 500 for performing optical sensor adaptive calibration in accordance with one or more implementations. Further for explanatory purposes, the blocks of the sequential process 500 are described herein as occurring in serial, or linearly. However, multiple blocks of the process 500 may occur in parallel. In addition, the blocks of the process 500 need not be performed in the order shown and/or one or more of the blocks of the process 500 need not be performed.

In FIG. 5, the process 500 starts at step 502, where the subject system optimizes synthetic sensor data selection and processes from a global oil and gas database. For example, the diversity of training data selection and synthetic sensor response simulation are optimized to minimize the difference between simulation results and actual measured sensor responses.

Next, at step 504, the subject system unitizes actual and synthetic sensor data scaling on selected reference fluids. For example, the scale of measured actual sensor data and simulated synthetic sensor data are unitized on the selected reference fluids to improve data correlation. In some aspects, the sensor data is extracted from a corresponding sensor response, where the sensor response is a function of channel index. In some aspects, the reference fluids typically consist of representative samples of dead oil, live oil, nature gas, water and nitrogen and other easily-obtainable non-petroleum fluids to manipulate data distribution.

Subsequently, at step 506, training subsets are expanded with data normalization by normalizing additional synthetic and actual sensor data to the dynamic data range of the given reference fluids. In some aspects, the normalized synthetic sensor data, for example, may exceed the dynamic data range of the reference fluids. As such, training on out-of-range synthetic sensor data may help moderate prediction with actual sensor data on new fluids.

Next, at step 508, the synthetic and actual sensor data are combined to form a pooled calibration database. In some aspects, the synthetic sensor data distribution in adaptive calibration would mimic actual sensor data variation in potential applications, thus making future real-time data processing more robust.

Subsequently, at step 510, one or more neural networks are used to build fluid predictive models based on the pooled calibration database. Although standard multi-layer MISO (multi-inputs and single-output) feedforward neural network and ensemble networks can be deployed in adaptive calibration to predict each fluid answer product, the increased complexity of member network structure may be employed to improve calibration accuracy with merged data in synthetic and actual sensor spaces.

Figure 6:
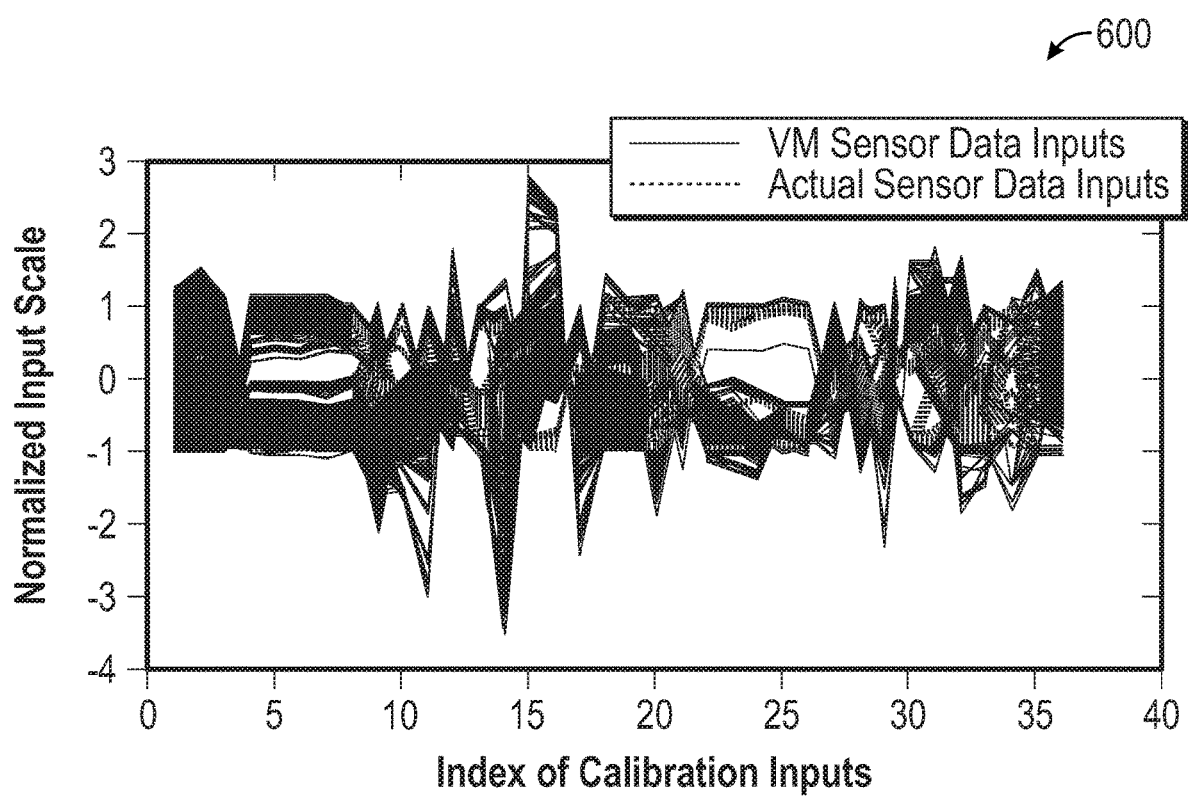
FIG. 6 illustrates a waveform depicting exemplary inputs for the optical sensor adaptive calibration of FIG. 5 in accordance with one or more implementations of the subject technology.

FIG. 6 illustrates a waveform 600 depicting exemplary inputs for the optical sensor adaptive calibration of FIG. 5 in accordance with one or more implementations. The waveform 600 includes synthetic sensor data inputs superimposed with actual sensor data inputs on a normalized scale with dynamic range on calibration inputs varied from about −4 to about +3.

Figure 7:
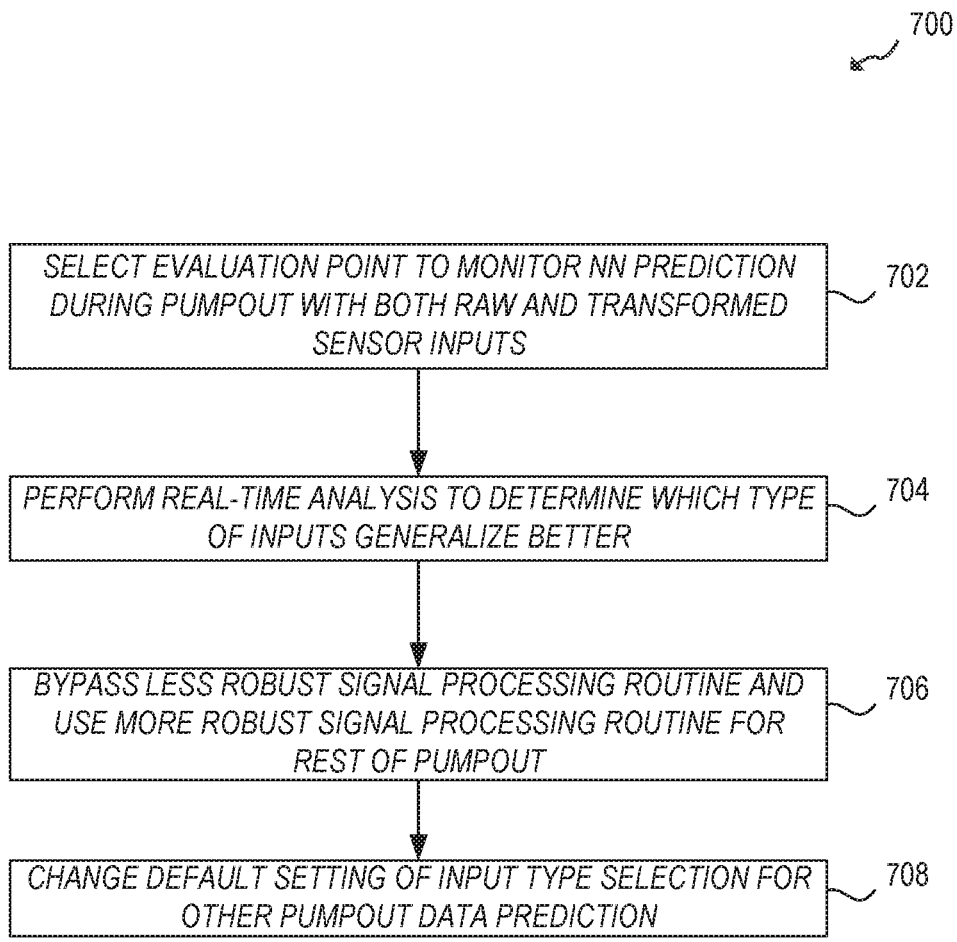
FIG. 7 illustrates a flowchart diagram of an example of process for optimizing real-time data processing in accordance with one or more implementations of the subject technology.
Figure 8A:
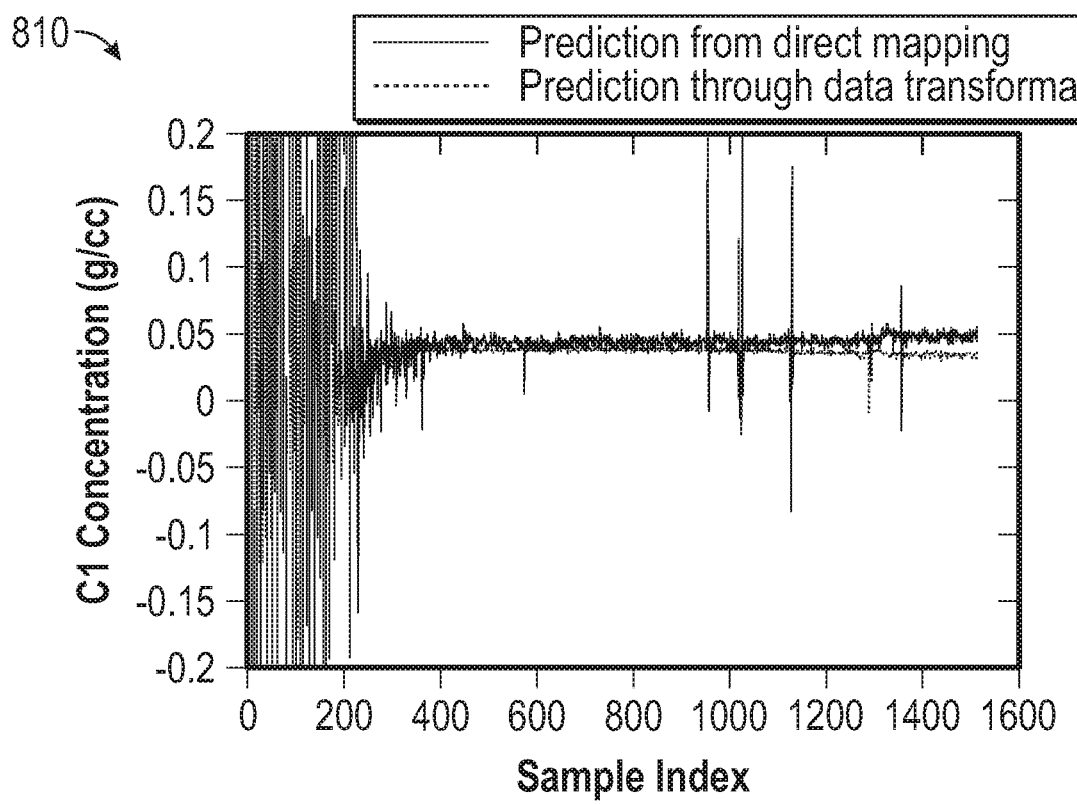
FIGS. 8A to 8D illustrate waveforms depicting respective comparisons of results of a real-world data prediction example from direct mapping without using optical data transformation and the results of prediction through optical data transformation in accordance with one or more implementations of the subject technology.
Figure 8B:
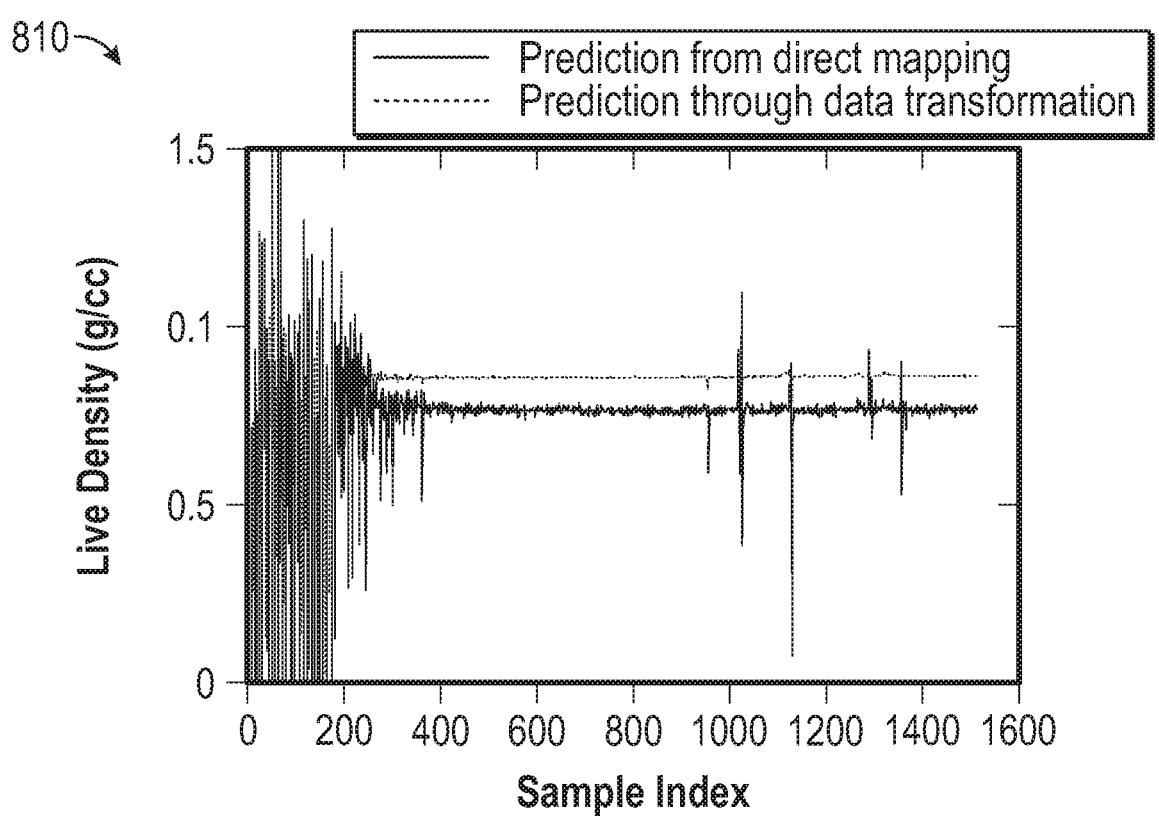
Figure 8C:
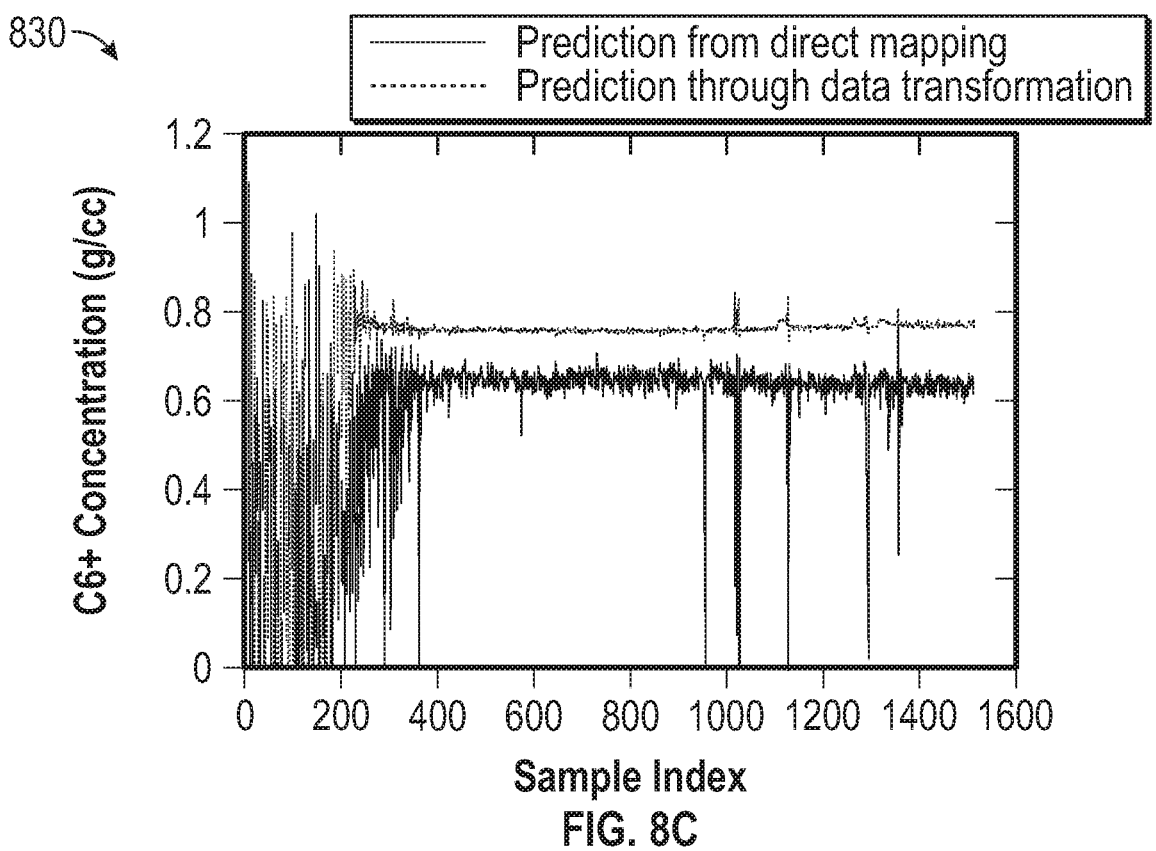
Figure 8D:
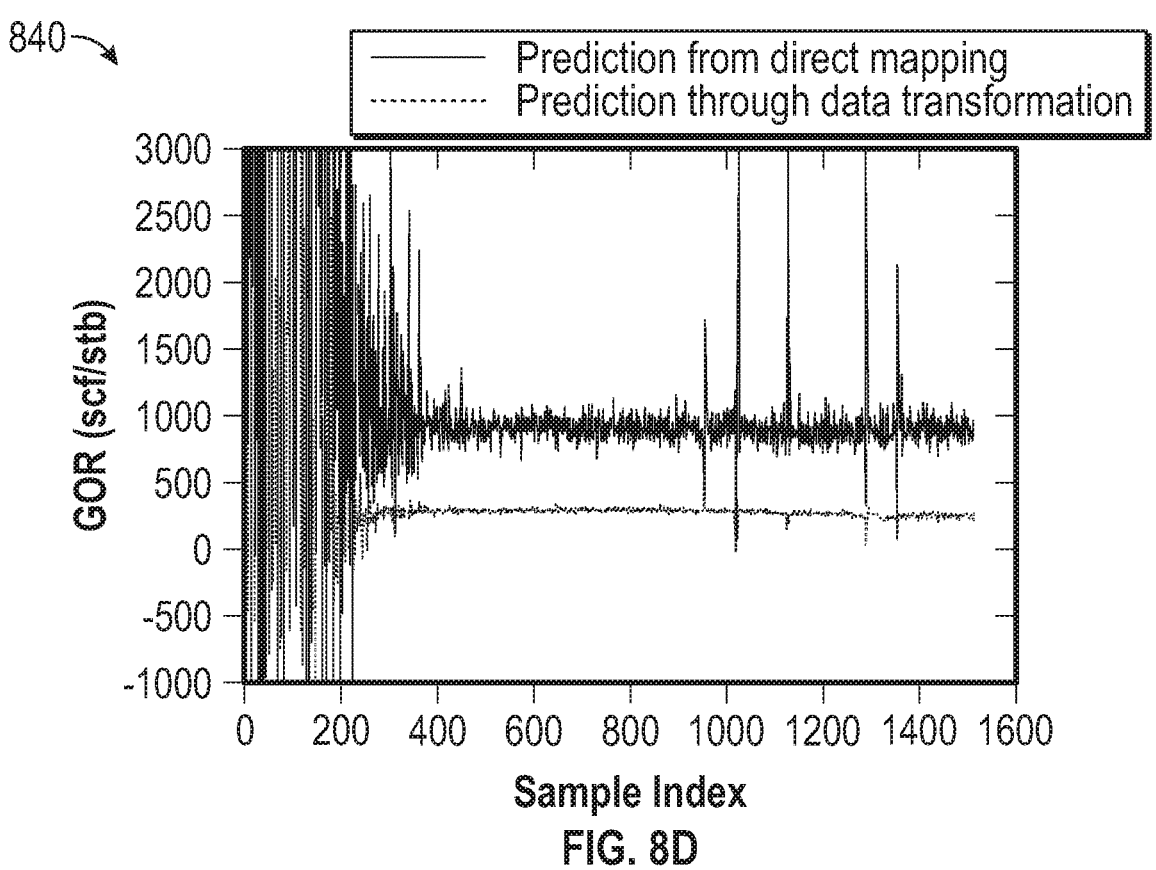

FIG. 7 illustrates a flowchart diagram of an example of a process 700 for optimizing real-time data processing in accordance with one or more implementations. Further for explanatory purposes, the blocks of the sequential process 700 are described herein as occurring in serial, or linearly. However, multiple blocks of the process 700 may occur in parallel. In addition, the blocks of the process 700 need not be performed in the order shown and/or one or more of the blocks of the process 700 need not be performed.

In FIG. 7, the process 700 applies the fluid answer product predictive models generated from adaptive calibration during a field job of formation sampling and testing for either a single pumpout scenario or multi-pumpout scenarios. The process 700 starts at step 702, where an evaluation point is selected to monitor a neural network (NN) prediction during pumpout with both raw and transformed sensor inputs.

Next, at step 704, a real-time quality analysis is performed to determine which type of inputs generalizes better. Subsequently, at step 706, the less robust signal processing routine is bypassed and the more robust signal processing routine is used for the rest of the pumpout scenario. Next, at step 708, a default setting of input type selection is changed for other pumpout data predictions.

FIGS. 8A to 8D illustrate waveforms depicting respective comparisons of results of a real-world data prediction example from direct mapping without using optical data transformation in accordance with one or more implementations of the subject technology.

Each of the waveforms in FIGS. 8A to 8D compares the results of a real-world data prediction example from direct mapping (without using conventional optical data transformation) as described in this disclosure and through actual sensor to synthetic sensor data transformation in current standard practice. Note that a first curve (e.g., directed to a prediction from direct mapping) and a second curve (e.g., directed to a prediction through data transformation) in each plot (e.g., 810, 820, 830, 840) are produced with same models from the adaptive calibration using actual and synthetic sensor inputs respectively.

It can be observed from the plots (e.g., 810, 820, 830, 840) that the adaptive calibration methodology facilitates in smoothing the predictions depicted by the second curve. The difference between the second curve and the first curve predictions can be explained by extra error that may be introduced by additional data transformation (functional filter) of the second curves due to the use of a limited number of reference fluids in the transformation algorithm development. In comparison, the output curves from direct mapping are also self-consistent in predicted C1 concentration (e.g., 810), live fluid density (e.g., 820), C6+ concentration such as approximated sum of saturates, aromatics, resins and asphaltenes concentrations (e.g., 830), and GOR (e.g., 840), where the data quality may also be sufficient for early decision making. The availability of both records makes future output correction convenient when lab results on field samples become available, including evaluation of transformation error from the second curve predictions (i.e., through data transformation) and estimate of the bias from the first curve (i.e., from direct mapping) associated with actual sensor training data distribution.

Figure 9:
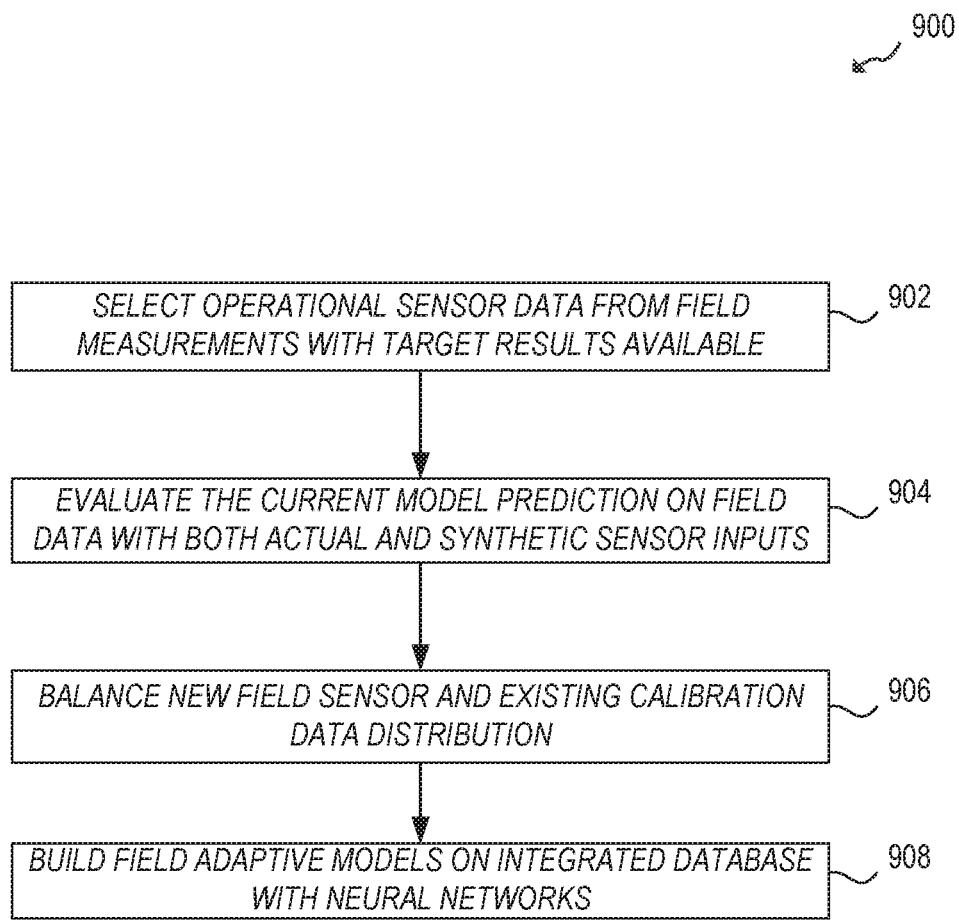
FIG. 9 illustrates a flowchart diagram of an example of process for performing sensor-and-field-based neural network calibration adapted to both actual and synthetic sensor responses in accordance with one or more implementations of the subject technology.

FIG. 9 illustrates a flowchart diagram of an example of a process 900 for performing sensor-and-field-based neural network calibration adapted to both actual and synthetic sensor data. Further for explanatory purposes, the blocks of the sequential process 900 are described herein as occurring in serial, or linearly. However, multiple blocks of the process 900 may occur in parallel. In addition, the blocks of the process 900 need not be performed in the order shown and/or one or more of the blocks of the process 900 need not be performed.

In FIG. 9, the process 900 summarizes the steps of alternative implementations that may be field (geological or geographical region) specific. When a particular optical sensor is used locally multiple times, and lab results or reliable QC results on fluid samples of a previous job become available, it is sensible to update the fluid predictive model calibration and make it adaptive to local environmental change. Note that data integration is applied to the actual sensor space with the same normalization scheme discussed in FIG. 5. To optimize the new field sensor data and existing calibration data distribution, performance evaluation of current models on field data using both synthetic and actual sensor inputs is applied. The job relevant sensor data can be used alone or integrated with existing calibration data to build new adaptive fluid models.

The process 900 starts at step 902, where operational sensor data is selected from field measurements when target fluid results are available. Next, at step 904, a current model prediction on field data is evaluated with both actual and synthetic sensor inputs. Subsequently, at step 906, a new field sensor is balanced with an existing calibration data distribution. Next, at step 908, field adaptive models are built on an integrated database with neural networks.

FIG. 10 illustrates an implementation of a general transformation model framework including a forward transformation 1005 and a reverse transformation 1003 between data in a tool parameter space 1001 and a synthetic parameter space 1002 with a non-linear algorithm. In some implementations, the non-linear algorithm used to implement both the reverse transformation 1003 and/or the forward transformation 1005 is the NN algorithm. In some implementations, the forward 1005 or reverse 1003 transformation includes a multi-input, multi-output neural network that may be applied by the fluid analysis device 134 of FIG. 1 to receive inputs and generate outputs of sensing element responses. The model that converts the actual sensing element responses (SW/Ch01-Ch0n) from tool parameter space 1001 to synthetic parameter space 1002 (PVT/Ch01-Ch0n) is referred to as reverse transformation 1003. The model that converts data from synthetic parameter space 1002 into tool parameter space 1001 is referred to as forward transformation 1005. Although the illustrated general transformation model framework in FIG. 10 is configured with multi-input/ multi-output non-linear neural networks, there is no limitation in using other non-linear and linear transformation algorithms with single-input/single-output and multi-input/ single-output configurations.

In some implementations, the NN algorithm may be deployed to obtain a fluid characteristic using an ICE response and environmental factors such as a fluid temperature, a fluid pressure, and a fluid density (hereinafter collectively referred to as material factors). The NN algorithm may include one or more hidden layers with each of the hidden nodes implemented with a nonlinear transfer function (e.g., hyperbolic tangent sigmoid, or logarithmic sigmoid). The net input of each hidden node on a first hidden layer is a weighted linear combination of all calibration inputs according to the node connection. After the net input is received at each hidden node, the NN algorithm calculates net output using the equipped nonlinear transfer function. The net output of first hidden layer at each node may then be fed as input into nodes on a second hidden layer (not shown). The single node on an output layer can be implemented with either a linear transfer function or nonlinear transfer function. In some implementations, output node fluid characteristic may be a weighted linear combination, receiving inputs from outputs of the second hidden layer.

Figure 11A:
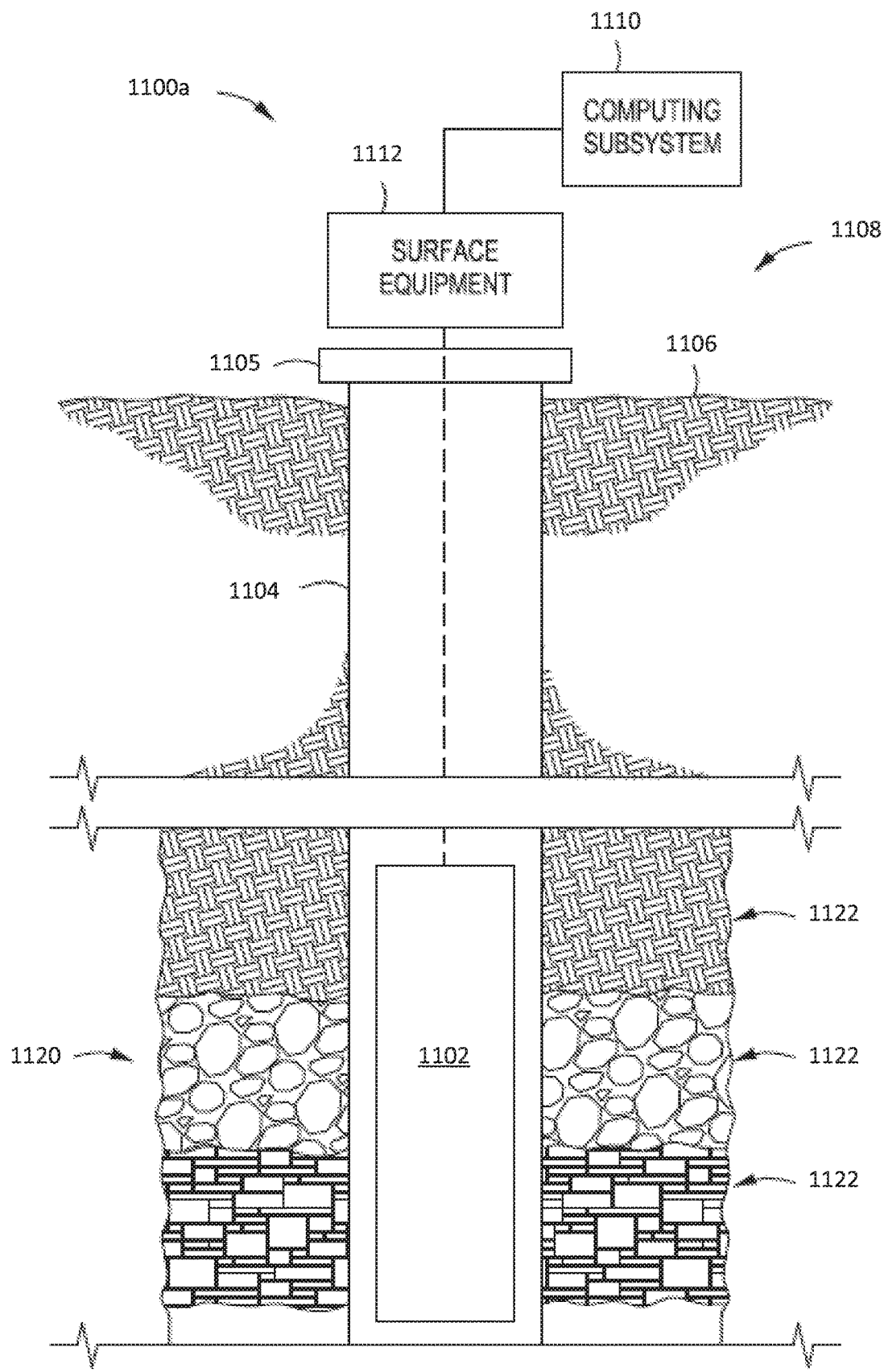
FIG. 11A illustrates a schematic view of a logging operation deployed in and around a well system in accordance with one or more implementations of the subject technology.

FIG. 11A depicts a schematic view of a logging operation deployed in and around a well system 1100a in accordance with one or more implementations. The well system 1100a includes a logging system 1108 and a subterranean region 1120 beneath the ground surface 1106. The well system 1100a can also include additional or different features that are not shown in FIG. 11A. For example, the well system 1100a can include additional drilling system components, wireline logging system components, or other components.

The subterranean region 1120 includes all or part of one or more subterranean formations or zones. The subterranean region 1120 shown in FIG. 11A, for example, includes multiple subsurface layers 1122. The subsurface layers 1122 can include sedimentary layers, rock layers, sand layers, or any combination thereof and other types of subsurface layers. One or more of the subsurface layers can contain fluids, such as brine, oil, gas, or combinations thereof. A wellbore 1104 penetrates through the subsurface layers 1122. Although the wellbore 1104 shown in FIG. 11A is a vertical wellbore, the logging system 1108 can also be implemented in other wellbore orientations. For example, the logging system 1108 may be adapted for horizontal wellbores, slant wellbores, curved wellbores, vertical wellbores, or any combination thereof.

The logging system 1108 also includes a logging tool 1102, surface equipment 1112, and a computing subsystem 1110. In the shown in FIG. 11A, the logging tool 1102 is a downhole logging tool that operates while disposed in the wellbore 1104. The surface equipment 1112 shown in FIG. 11A operates at or above the surface 1106, for example, near the well head 1105, to control the logging tool 1102 and possibly other downhole equipment or other components of the well system 1100a. The computing subsystem 1110 receives and analyzes logging data from a logging tool 1102. A logging system can include additional or different features, and the features of a logging system can be arranged and operated as represented in FIG. 11A or in another manner.

All or part of the computing subsystem 1110 can be implemented as a component of, or integrated with one or more components of, the surface equipment 1112, the logging tool 1102, or both. For example, the computing subsystem 1110 can be implemented as one or more computing structures separate from but communicative with the surface equipment 1112 and the logging tool 1102.

The computing subsystem 1110 can be embedded in the logging tool 1102 (not shown), and the computing subsystem 1110 and the logging tool 1102 operate concurrently while disposed in the wellbore 1104. For example, although the computing subsystem 1110 is shown above the surface 1106 in FIG. 11A, all or part of the computing subsystem 1110 may reside below the surface 1106, for example, at or near the location of the logging tool 1102.

The well system 1100a includes communication or telemetry equipment that allows communication among the computing subsystem 1110, the logging tool 1102, and other components of the logging system 1108. For example, each of the components of the logging system 1108 can include one or more transceivers or similar apparatus for wired or wireless data communication among the various components. The logging system 1108 can include, but is not limited to, one or more systems and/or apparatus for wireline telemetry, wired pipe telemetry, mud pulse telemetry, acoustic telemetry, electromagnetic telemetry, or any combination of these and other types of telemetry. In some implementations, the logging tool 1102 receives commands, status signals, or other types of information from the computing subsystem 1110 or another source. The computing subsystem 1110 can also receive logging data, status signals, or other types of information from the logging tool 1102 or another source.

Logging operations are performed in connection with various types of downhole operations at various stages in the lifetime of a well system and therefore structural attributes and components of the surface equipment 1112 and logging tool 1102 are adapted for various types of logging operations. For example, logging may be performed during drilling operations, during wireline logging operations, or in other contexts. As such, the surface equipment 1112 and the logging tool 1102 can include or operate in connection with drilling equipment, wireline logging equipment, or other equipment for other types of operations.

Figure 11B:
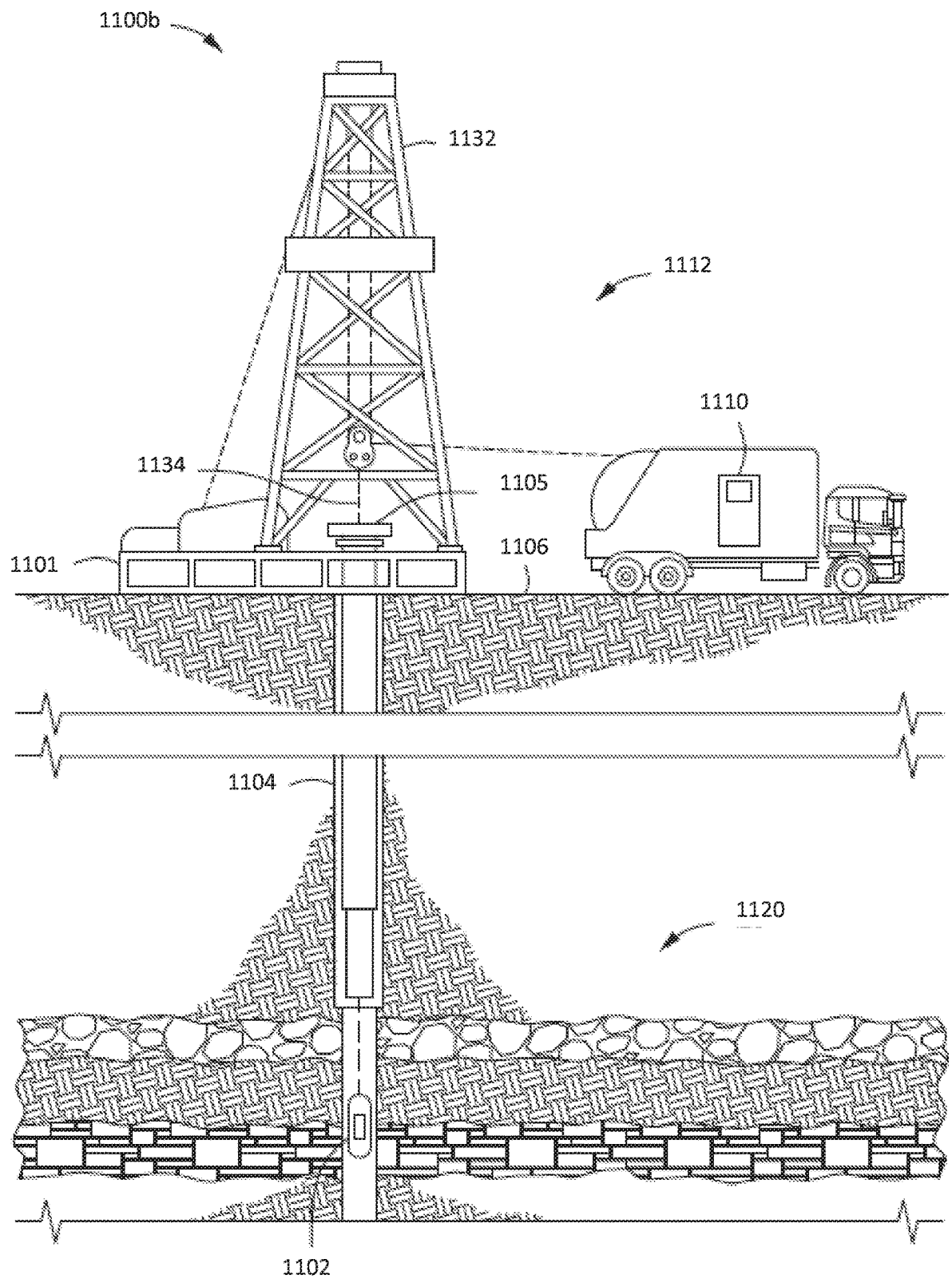
FIG. 11B illustrates a schematic view of a wireline logging operation deployed in and around a well system in accordance with one or more implementations of the subject technology.

FIG. 11B depicts a schematic view of a wireline logging operation deployed in and around a well system 1100b in accordance with one or more implementations. The well system 1100b includes the logging tool 1102 in a wireline logging environment. The surface equipment 1112 includes, but is not limited to, a platform 1101 disposed above the surface 1106 equipped with a derrick 1132 that supports a wireline cable 1134 extending into the wellbore 1104. Wireline logging operations are performed, for example, after a drill string is removed from the wellbore 1104, to allow the wireline logging tool 1102 to be lowered by wireline or logging cable into the wellbore 1104.

Figure 11C:
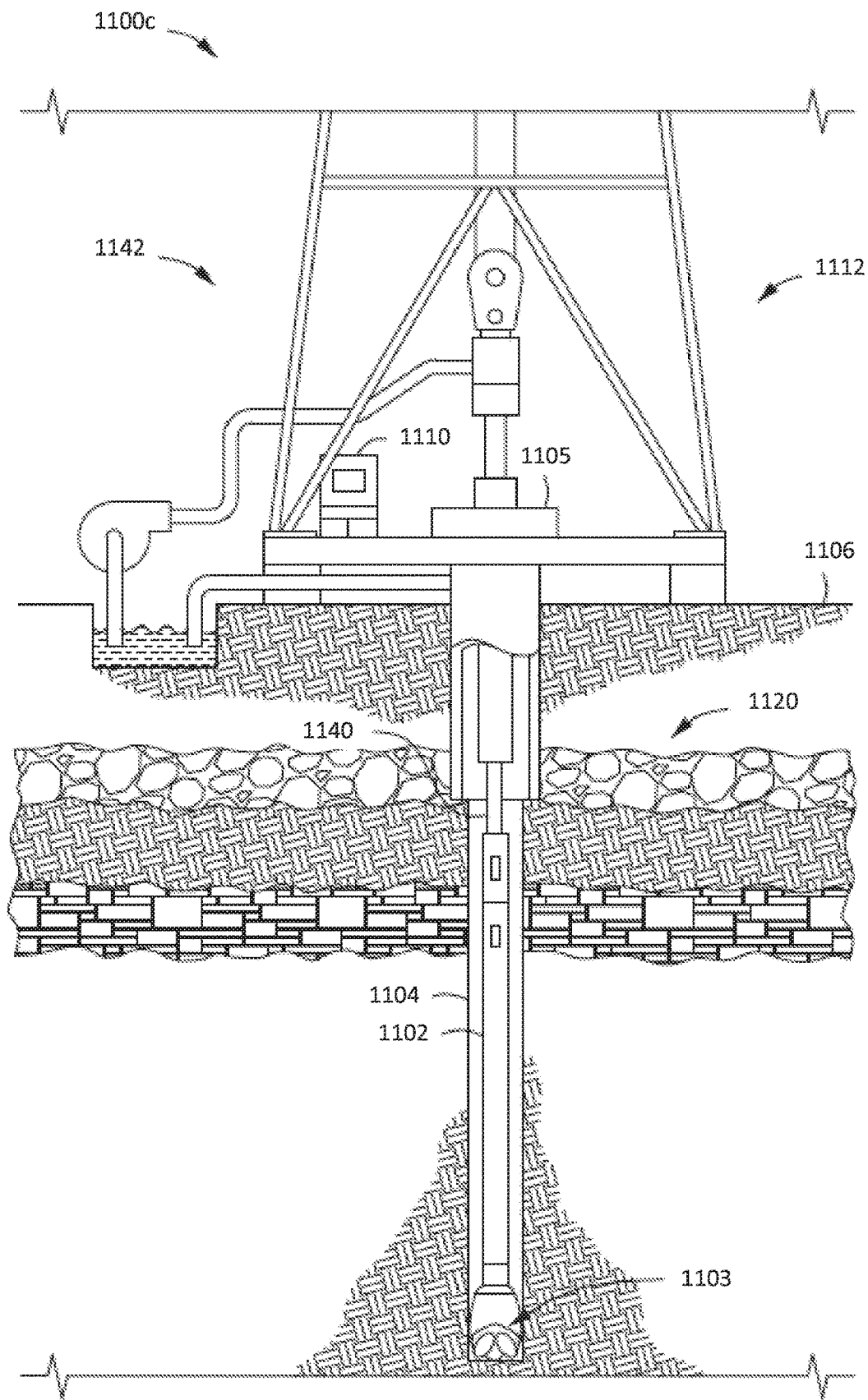
FIG. 11C illustrates a schematic view of a well system that includes the logging tool in a logging while drilling (LWD) environment in accordance with one or more implementations of the subject technology.

FIG. 11C depicts a schematic view of a well system 1100c that includes the logging tool 1102 in a logging while drilling (LWD) environment in accordance with one or more implementations. In some implementations, the LWD environment includes logging operations being performed during drilling operations. Drilling is performed using a string of drill pipes connected together to form a drill string 1140 that is lowered through a rotary table into the wellbore 1104. A drilling rig 1142 at the surface 1106 supports the drill string 1140, as the drill string 1140 is operated to drill a wellbore penetrating the subterranean region 1120. The drill string 1140 can include, for example, but is not limited to, a kelly, a drill pipe, a bottom hole assembly, and other components. The bottomhole assembly on the drill string can include drill collars, drill bits, the logging tool 1102, and other components. Exemplary logging tools can be or include, but are not limited to, measuring while drilling (MWD) tools and LWD tools.

The logging tool 1102 includes a tool for obtaining measurements from the subterranean region 1120. As shown, for example, in FIG. 11B, the logging tool 1102 is suspended in the wellbore 1104 by a coiled tubing, wireline cable, or another structure or conveyance that connects the tool to a surface control unit or other components of the surface equipment 1112.

The logging tool 1102 is lowered to the bottom of a region of interest and subsequently pulled upward (e.g., at a substantially constant speed) through the region of interest. As shown, for example, in FIG. 11C, the logging tool 1102 is deployed in the wellbore 1104 on jointed drill pipe, hard wired drill pipe, or other deployment hardware. In other example implementations, the logging tool 1102 collects data during drilling operations as it moves downward through the region of interest. The logging tool 1102 may also collect data while the drill string 1140 is moving, for example, while the logging tool 1102 is being tripped in or tripped out of the wellbore 1104.

The logging tool 1102 may also collect data at discrete logging points in the wellbore 1104. For example, the logging tool 1102 moves upward or downward incrementally to each logging point at a series of depths in the wellbore 1104. At each logging point, instruments in the logging tool 1102 perform measurements on the subterranean region 1120. The logging tool 1102 also obtains measurements while the logging tool 1102 is moving (e.g., being raised or lowered). The measurement data is communicated to the computing subsystem 1110 for storage, processing, and analysis. Such data may be gathered and analyzed during drilling operations (e.g., LWD operations), during wireline logging operations, other conveyance operations, or during other types of activities.

The computing subsystem 1110 receives and analyzes the measurement data from the logging tool 1102 to detect properties of various subsurface layers 1122. For example, the computing subsystem 1110 can identify the density, material content, and/or other properties of the subsurface layers 1122 based on the measurements acquired by the logging tool 1102 in the wellbore 1104.

Figure 12:
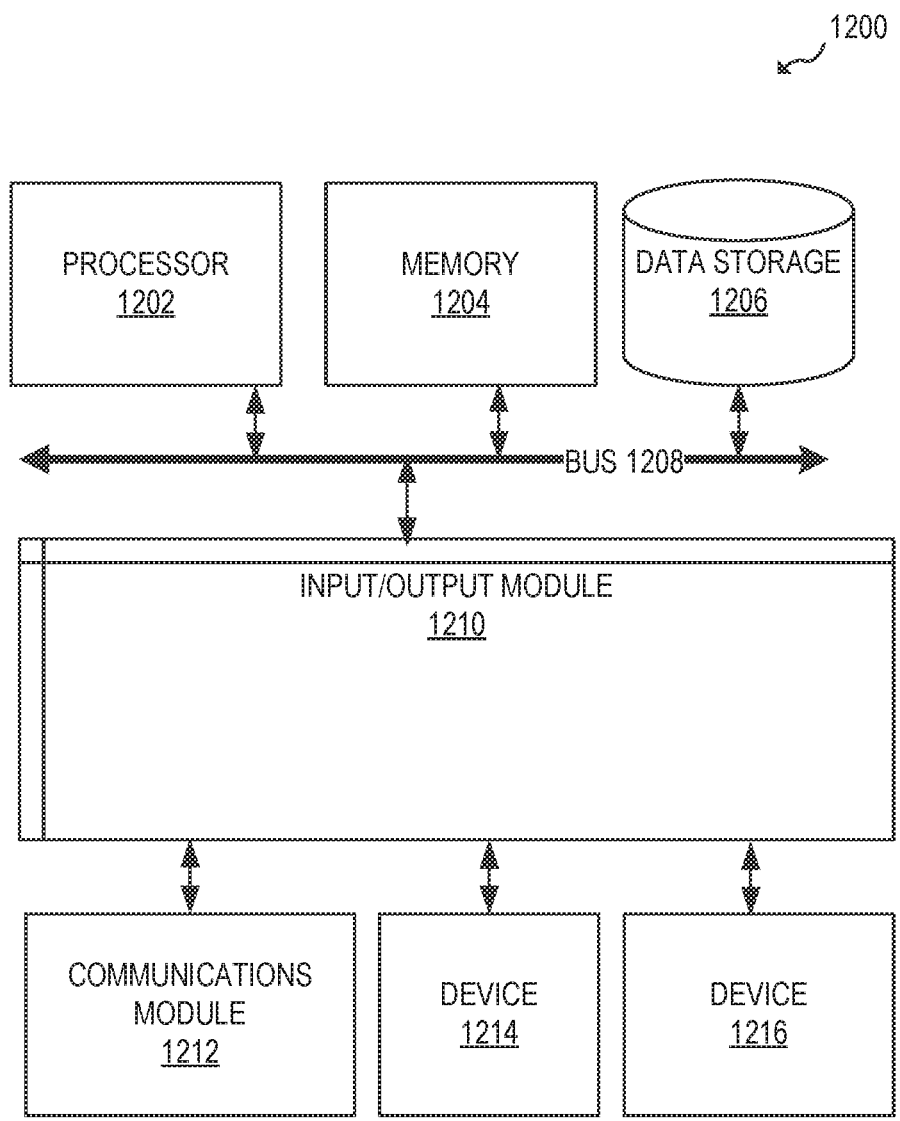
FIG. 12 is a block diagram illustrating an example computer system with which the computing subsystem of FIG. 11A can be implemented.

FIG. 12 is a block diagram illustrating an exemplary computer system 1200 with which the computing subsystem 1110 of FIG. 11A can be implemented. In certain aspects, the computer system 1200 may be implemented using hardware or a combination of software and hardware, either in a dedicated server, integrated into another entity, or distributed across multiple entities.

Computer system 1200 (e.g., computing subsystem 1110) includes a bus 1208 or other communication mechanism for communicating information, and a processor 1202 coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, i.e., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. The input/output module 1210 can be any input/output module. Exemplary input/output modules 1210 include data ports such as USB ports. The input/output module 1210 is configured to connect to a communications module 1212. Exemplary communications modules 1212 include networking interface cards, such as Ethernet cards and modems. In certain aspects, the input/output module 1210 is configured to connect to a plurality of devices, such as an input device 1214 and/or an output device 1216. Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1216 include display devices such as an LCD (liquid crystal display) monitor, for displaying information to the user, or diagnostic devices such as an oscilloscope.

According to one aspect of the present disclosure, the computing subsystem 110 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in the main memory 1204 causes processor 1202 to perform the process steps described herein. One or more processors in a multi-processing arrangement may also be employed to execute the sequences of instructions contained in the memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone such as a smartphone.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

According to one embodiment of the subject technology, a method includes deploying an optical tool into a wellbore penetrating a subterranean formation; obtaining field measurements with the deployed optical tool; determining an adaptive fluid predictive model calibrated with a plurality of types of sensor data, the plurality of types of sensor responses comprising a first type of sensor response associated with a synthetic parameter space and a second type of sensor response associated with a tool parameter space; applying, in a processor circuit, the adaptive fluid predictive model to one or more fluid samples from the obtained field measurements; determining a value of a fluid answer product prediction with the applied adaptive fluid predictive model; and providing a fluid answer signal indicating the value of the fluid answer product prediction for facilitating downhole fluid sampling with a wellbore operation.

According to one embodiment of the subject technology, a system includes a downhole tool; and a fluid analysis device operably coupled to the downhole tool and having a memory and a processor, wherein the memory comprises commands which, when executed by the processor, cause the fluid analysis device to select at least one of a plurality of evaluation points in a fluid predictive model to monitor the fluid predictive model during a pumpout operation with a plurality of types of sensor data inputs, the plurality of types of sensor data inputs comprising synthetic sensor responses and actual sensor responses; apply, in a processing circuit, the fluid predictive model to the plurality of types of sensor data inputs the selected evaluation point; determine which type of the plurality of types of sensor data inputs produces a more robust signal output with the applied fluid predictive model within the selected at least one of the plurality of evaluation points; bypass type of sensor data that produces a less robust signal output with the fluid predictive model; apply the type of sensor data that produces the more robust signal output with the fluid predictive model for a remainder duration of the pumpout operation; and modify a setting of input type selection to the fluid predictive model with the applied type of sensor data for facilitating other pumpout data prediction associated with a wellbore operation.

According to one embodiment of the subject technology, a non-transitory computer-readable medium storing instructions which, when executed by a processor, cause a computer to obtain available target fluid results on fluid samples of a prior field measurement; select a type of sensor data from field measurements associated with the available target fluid results; determine an adaptive fluid predictive model calibrated with a plurality of types of sensor inputs; apply, in a processing circuit, the adaptive fluid predictive model to the selected type of sensor data; process a signal output of the adaptive fluid predictive model; determine whether the signal output associated with the selected type of sensor data does not exceed a predetermined output correction threshold; integrate the selected type of sensor data to an existing calibration data distribution with a normalization algorithm to form a modified calibration data distribution when the signal output is determined not to exceed the predetermined output correction threshold; and generate a modified adaptive fluid predictive model using the modified calibration data distribution with neural networks.

In one or more aspects, examples of clauses are described below.

A method comprising one or more methods, operations or portions thereof described herein.

An apparatus comprising one or more memories and one or more processors (e.g., 1200), the one or more processors configured to cause performing one or more methods, operations or portions thereof described herein.

An apparatus comprising one or more memories (e.g., 1204, one or more internal, external or remote memories, or one or more registers) and one or more processors (e.g., 1202) coupled to the one or more memories, the one or more processors configured to cause the apparatus to perform one or more methods, operations or portions thereof described herein.

An apparatus comprising means (e.g., 1200) adapted for performing one or more methods, operations or portions thereof described herein.

A processor (e.g., 1202) comprising modules for carrying out one or more methods, operations or portions thereof described herein.

A hardware apparatus comprising circuits (e.g., 1200) configured to perform one or more methods, operations or portions thereof described herein.

An apparatus comprising means (e.g., 1200) adapted for performing one or more methods, operations or portions thereof described herein.

An apparatus comprising components (e.g., 1200) operable to carry out one or more methods, operations or portions thereof described herein.

A computer-readable storage medium (e.g., 1204, one or more internal, external or remote memories, or one or more registers) comprising instructions stored therein, the instructions comprising code for performing one or more methods or operations described herein.

A computer-readable storage medium (e.g., 1204, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b." or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
   deploying an optical tool into a wellbore penetrating a subterranean formation;
   obtaining field measurements with the deployed optical tool;
   determining an adaptive fluid predictive model calibrated with a plurality of types of sensor data, the plurality of types of sensor responses comprising a first type of sensor response associated with a synthetic parameter space and a second type of sensor response associated with a tool parameter space;
   applying, in a processor circuit, the adaptive fluid predictive model to one or more fluid samples from the obtained field measurements;
   determining a value of a fluid answer product prediction with the applied adaptive fluid predictive model; and
   providing a fluid answer signal indicating the value of the fluid answer product prediction for facilitating downhole fluid sampling with a wellbore operation.

2. The method of claim 1, wherein determining the adaptive fluid predictive model comprises:
   calibrating fluid answer product predictive models for real-time downhole fluid analysis during formation fluid sampling and testing using synthetic sensor data of the first type of sensor response and actual sensor data of the second type of sensor response with corresponding target fluid characteristics.

3. The method of claim 1, further comprising:
   calibrating a transformation algorithm on a selected number of reference fluids with measured actual sensor responses and synthetic sensor responses at same temperature and pressure setting points.

4. The method of claim 3, wherein the transformation algorithm is calibrated using a training data distribution that includes an actual sensor data distribution and a synthetic sensor data distribution.

5. The method of claim 4, wherein the training data distribution represents fluid information of a plurality of reference fluids in different geographical regions.

6. The method of claim 3, further comprising:
   converting the second type of sensor response to the first type of sensor response through a nonlinear mapping using the transformation algorithm with one or more neural networks.

7. The method of claim 1, further comprising:
   synthesizing the first type of sensor response from one or more optical fluid spectroscopy measurements, measured sensor wheel transmittance spectra, and transfer function of an optical train in the optical tool.

8. The method of claim 1, wherein determining the adaptive fluid predictive model comprises:
   combining the second type of sensor response with the first type of sensor response through a normalization algorithm to create an integrated data calibration distribution.

9. The method of claim 1, further comprising:
   obtaining prior operational sensor data;
   modifying a calibration of a fluid predictive model with the obtained prior operational sensor data; and
   providing a regional historical fluid data interpretation with the modified calibration of the fluid predictive model.

10. The method of claim 9, wherein the calibration of the fluid predictive model is modified with the prior operational sensor data and a calibration data distribution that includes actual and synthetic sensor data.

11. The method of claim 10, wherein the prior operational sensor data is obtained with the optical tool in a region of the subterranean formation that corresponds to that of the calibration data distribution.

12. A system, comprising:
    a downhole tool; and
    a fluid analysis device operably coupled to the downhole tool and having a memory and a processor, wherein the memory comprises commands which, when executed by the processor, cause the fluid analysis device to:
    select at least one of a plurality of evaluation points in a fluid predictive model to monitor the fluid predictive model during a pumpout operation with a plurality of types of sensor data inputs, the plurality of types of sensor data inputs comprising synthetic sensor responses and actual sensor responses;
    apply, in a processing circuit, the fluid predictive model to the plurality of types of sensor data inputs the selected evaluation point;
    determine which type of the plurality of types of sensor data inputs produces a more robust signal output with the applied fluid predictive model within the selected at least one of the plurality of evaluation points;
    bypass type of sensor data that produces a less robust signal output with the fluid predictive model;
    apply the type of sensor data that produces the more robust signal output with the fluid predictive model for a remainder duration of the pumpout operation; and
    modify a setting of input type selection to the fluid predictive model with the applied type of sensor data for facilitating other pumpout data prediction associated with a wellbore operation.

13. The system of claim 12, wherein the commands which, when executed by the processor, further cause the system to:
    generate training data with a diverse selection of the actual sensor responses from a plurality of optical tool sources; and
    reduce a difference between the synthetic sensor responses and the actual sensor responses from the training data to optimize the synthetic sensor responses.

14. The system of claim 13, wherein the commands which, when executed by the processor, further cause the system to:
    unitize a scale of the actual sensor responses and the synthetic sensor responses on selected reference fluids to increase a data correlation between the actual sensor responses and the synthetic sensor responses; and normalize the unitized scale of the synthetic sensor responses and the actual sensor responses with a dynamic range of the selected reference fluids to form a normalized scale of the synthetic sensor responses and the actual sensor responses.

15. The system of claim 14, wherein the commands which, when executed by the processor, further cause the system to:

combine the synthetic sensor responses and the actual sensor responses from the normalized scale to form a pooled calibration database with a plurality of calibration input patterns; and generate one or more adaptive fluid predictive models using the plurality of calibration input patterns from the pooled calibration database with neural networks.

16. The system of claim 12, wherein the commands which, when executed by the processor, further cause the system to:

recalibrate the fluid predictive model with prior field job data to generate a reconstructed fluid predictive model.

17. A non-transitory computer-readable medium storing instructions which, when executed by a processor, cause a computer to:

obtain available target fluid results on fluid samples of a prior field measurement;

select a type of sensor data from field measurements associated with the available target fluid results;

determine an adaptive fluid predictive model calibrated with a plurality of types of sensor inputs;

apply, in a processing circuit, the adaptive fluid predictive model to the selected type of sensor data;

process a signal output of the adaptive fluid predictive model;

determine whether the signal output associated with the selected type of sensor data does not exceed a predetermined output correction threshold;

integrate the selected type of sensor data to an existing calibration data distribution with a normalization algorithm to form a modified calibration data distribution when the signal output is determined not to exceed the predetermined output correction threshold; and generate a modified adaptive fluid predictive model using the modified calibration data distribution with neural networks.

18. The non-transitory computer-readable medium of claim 17, wherein the instructions which, when executed by the processor, further cause the computer to:

recalibrate the adaptive fluid predictive model with at least the selected type of sensor data for generating the modified adaptive fluid predictive model.

19. The non-transitory computer-readable medium of claim 17, wherein the instructions which, when executed by the processor, further cause the computer to:

determine a fluid characteristic using the modified adaptive fluid predictive model with the plurality of types of sensor inputs from the modified calibration data distribution.

20. The non-transitory computer-readable medium of claim 19, wherein the plurality of types of sensor inputs comprise an actual sensor input and a synthetic sensor input.

* * * * *